United States Patent
Schumacher et al.

(10) Patent No.: US 12,125,318 B1
(45) Date of Patent: Oct. 22, 2024

(54) APPARATUS AND A METHOD FOR DETECTING FRAUDULENT SIGNATURE INPUTS

(71) Applicant: Quick Quack Car Wash Holdings, LLC, Roseville, CA (US)

(72) Inventors: Josh David Schumacher, Sacramento, CA (US); Betsy Danielle Urschel, Germantown, TN (US)

(73) Assignee: Quick Quack Car Wash Holdings, LLC, Roseville, CA (US)

( * ) Notice: Subject to any disclaimer, the term of this patent is extended or adjusted under 35 U.S.C. 154(b) by 0 days.

(21) Appl. No.: 18/635,241

(22) Filed: Apr. 15, 2024

(51) Int. Cl.
| | |
|---|---|
| *G06V 10/00* | (2022.01) |
| *G06V 30/19* | (2022.01) |
| *G06V 30/226* | (2022.01) |
| *G06V 40/30* | (2022.01) |

(52) U.S. Cl.
CPC ........ *G06V 40/33* (2022.01); *G06V 30/19107* (2022.01); *G06V 30/226* (2022.01)

(58) Field of Classification Search
CPC ...... G06V 40/70; G06V 40/33; G06V 10/803; G06V 30/1918; G06V 30/226; G06V 30/19107; G06T 2207/20081; G06T 2207/20084; G06N 20/00; G06N 20/10; G06N 20/20; G06F 18/251
See application file for complete search history.

(56) References Cited

U.S. PATENT DOCUMENTS

| | | | |
|---|---|---|---|
| 5,872,844 A | * | 2/1999 | Yacobi ............... G06Q 20/3678 705/41 |
| 6,424,728 B1 | | 7/2002 | Ammar |

(Continued)

FOREIGN PATENT DOCUMENTS

| | | |
|---|---|---|
| CN | 115984975 A | 4/2023 |
| CN | 116824707 A | 9/2023 |
| WO | 2022142032 A1 | 7/2022 |

OTHER PUBLICATIONS

H. Ahmed et al; A Comparative Study among Handwritten Signature Verification Methods Using Machine Learning Techniques; Next-Generation Optimization Models and Algorithms in Cloud and Fog Computing 2022, vol. 2022, Published Oct. 15, 2022.

*Primary Examiner* — Amir Alavi
(74) *Attorney, Agent, or Firm* — Caldwell Intellectual Property Law

(57) ABSTRACT

An apparatus for detecting fraudulent signature inputs is disclosed. The apparatus includes at least a processor and a memory. The memory instructs the processor to receive a plurality of image data from a user. The memory instructs the processor to identify a plurality of signature elements as a function of the plurality of signature inputs. The memory instructs the processor to determine a plurality of signature scores as a function of the plurality of signature elements, wherein the plurality of signature scores comprises a first set of signature scores and a second set of signature scores. The memory instructs the processor to generate an accuracy threshold as a function of the first set of signature scores. The memory instructs the processor to determine one or more fraudulent signature inputs from the plurality of signature inputs as a function of a comparison of signature score to an accuracy threshold.

20 Claims, 9 Drawing Sheets

(56) References Cited

U.S. PATENT DOCUMENTS

| | | | | |
|---|---|---|---|---|
| 6,430,305 B1* | 8/2002 | Decker | ................ | G06F 18/254 |
| | | | | 382/116 |
| 6,920,440 B1* | 7/2005 | Barson | ................ | H04M 15/47 |
| | | | | 706/15 |
| 7,120,798 B2* | 10/2006 | Suisa | ................ | G06Q 20/3821 |
| | | | | 380/278 |
| 7,168,614 B2* | 1/2007 | Kotovich | ............. | G06Q 20/389 |
| | | | | 382/116 |
| 7,201,323 B2* | 4/2007 | Kotovich | ............. | G06Q 20/389 |
| | | | | 235/487 |
| 9,058,285 B2* | 6/2015 | Kossovsky | ............. | G06F 17/10 |
| 9,465,800 B2* | 10/2016 | Lacey | ................ | G06F 16/93 |
| 9,959,399 B2* | 5/2018 | Su | ................ | G06F 21/552 |
| 11,507,952 B1* | 11/2022 | McDonald | ............. | H04W 4/14 |
| 11,783,327 B2* | 10/2023 | Chakraborty | ............ | G06N 7/01 |
| | | | | 705/67 |
| 2001/0056410 A1* | 12/2001 | Ishigaki | ............. | G06Q 20/3825 |
| | | | | 705/67 |
| 2022/0245969 A1 | 8/2022 | Hong | | |

\* cited by examiner

APPARATUS AND A METHOD FOR DETECTING FRAUDULENT SIGNATURE INPUTS

FIELD OF THE INVENTION

The present invention generally relates to the field of image analysis. In particular, the present invention is directed to an apparatus and a method for detecting fraudulent signature inputs.

BACKGROUND

In an era where the security and authenticity of handwritten documents are increasingly paramount, particularly in legal, financial, and personal identification contexts, there exists a substantial need for reliable verification methods. Traditional approaches often rely heavily on manual examination by forensic experts, which, while effective, can be time-consuming and subject to human error. Automated approaches have fallen short in replicating the results achieved by forensics experts.

SUMMARY OF THE DISCLOSURE

In an aspect, an apparatus for the detecting fraudulent signature inputs is disclosed. The memory instructs the processor to receive a plurality of image data from a user. The memory instructs the processor to identify a plurality of signature elements as a function of the plurality of signature inputs. The memory instructs the processor to determine a plurality of signature scores as a function of the plurality of signature elements, wherein the plurality of signature scores comprises a first set of signature scores and a second set of signature scores. Determining the plurality of signature elements additionally includes iteratively training a score classifier using a plurality of score training data, wherein the plurality of score training data comprises the plurality of signature elements as inputs correlated to examples of signature scores as outputs. Determining the plurality of signature elements additionally includes identifying the plurality of signature scores as a function of the plurality of image data using a trained signature machine learning model. The memory instructs the processor to generate an accuracy threshold as a function of the first set of signature scores. The memory instructs the processor to determine one or more fraudulent signature inputs from the plurality of signature inputs as a function of a comparison of the second set of signature scores to the accuracy threshold.

In another aspect, a method for detecting fraudulent signature inputs is disclosed. The method includes receiving, using at least a processor, a plurality of image data from a user. The method includes identifying, using at least a processor, a plurality of signature elements as a function of the plurality of signature inputs. The method includes determining, using the at least a processor, a plurality of signature scores as a function of the plurality of signature elements, wherein the plurality of signature scores comprises a first set of signature scores and a second set of signature scores. Determining the plurality of signature elements additionally includes iteratively training a score classifier using a plurality of score training data, wherein the plurality of score training data comprises the plurality of signature elements as inputs correlated to examples of signature scores as outputs. Determining the plurality of signature elements additionally includes identifying the plurality of signature scores as a function of the plurality of image data using a trained signature machine learning model. The method includes generating, using the at least a processor, an accuracy threshold as a function of the first set of signature scores. The method includes determining, using the at least a processor, one or more fraudulent signature inputs from the plurality of signature inputs as a function of a comparison of the second set of signature scores to the accuracy threshold.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to an apparatus and a method for detecting fraudulent signature inputs is disclosed. The memory instructs the processor to receive a plurality of image data from a user. The memory instructs the processor to identify a plurality of signature elements as a function of the plurality of signature inputs. The memory instructs the processor to determine a plurality of signature scores as a function of the plurality of signature elements, wherein the plurality of signature scores comprises a first set of signature scores and a second set of signature scores. Determining the plurality of signature elements additionally includes iteratively training a score classifier using a plurality of score training data, wherein the plurality of score training data comprises the plurality of signature elements as inputs correlated to examples of signature scores as outputs. Determining the plurality of signature elements additionally includes identifying the plurality of signature scores as a function of the plurality of image data using a trained signature machine learning model. The memory instructs the processor to generate an accuracy threshold as a function of the first set of signature scores. The memory instructs the processor to determine one or more fraudulent signature inputs from the plurality of signature inputs as a function of a comparison of the second set of signature scores to the accuracy threshold. Exemplary embodiments illustrating aspects of the present disclosure are described below in the context of several specific examples.

Figure 1:
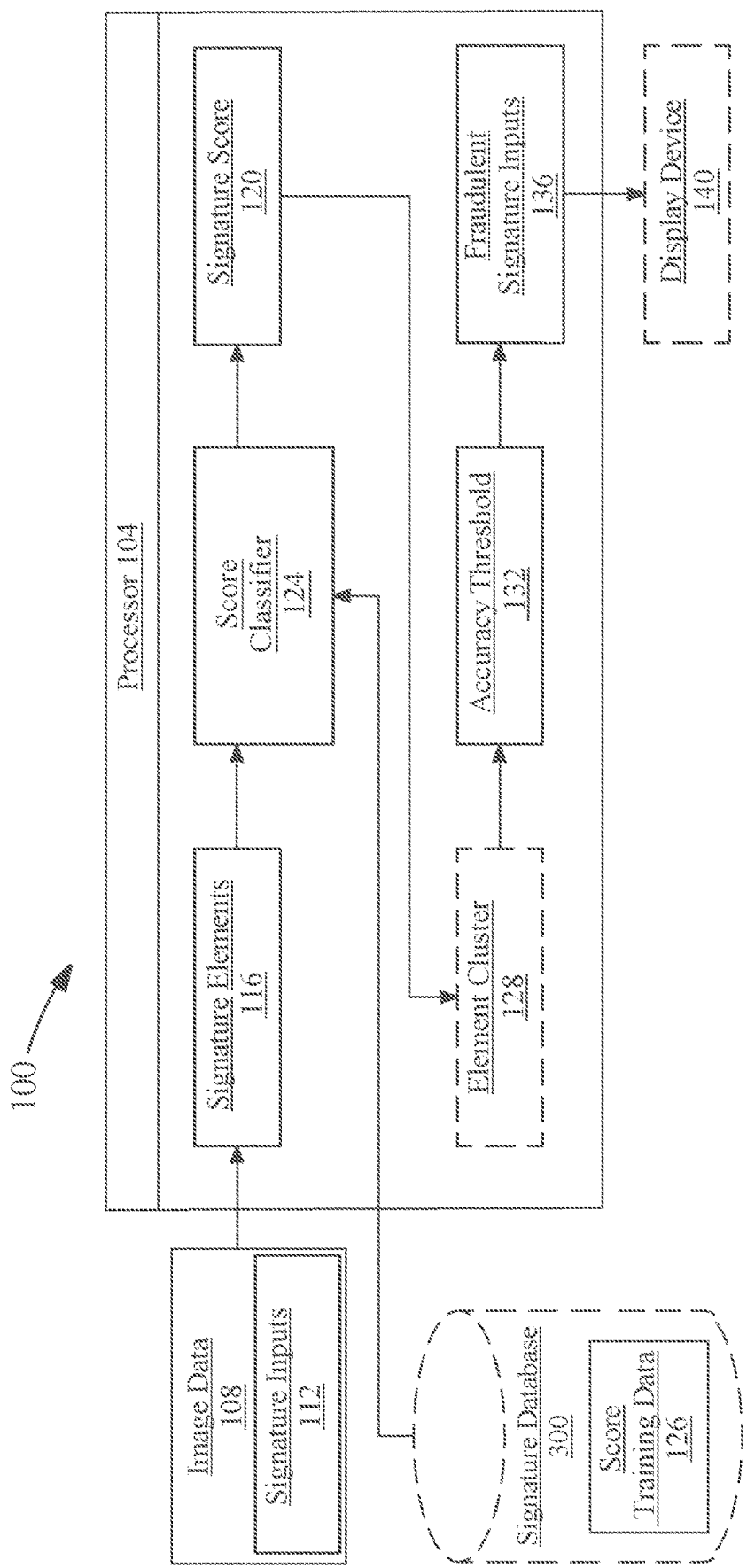
FIG. 1 is a block diagram of an exemplary embodiment of an apparatus for detecting fraudulent signature inputs.

Referring now to FIG. 1, an exemplary embodiment of an apparatus 100 for detecting fraudulent signature inputs is illustrated. Apparatus 100 includes a processor 104. Processor 104 may include any computing device as described in this disclosure, including without limitation a microcontroller, microprocessor, digital signal processor (DSP) and/or system on a chip (SoC) as described in this disclosure. Computing device may include, be included in, and/or communicate with a mobile device such as a mobile telephone or smartphone. Processor 104 may include a single computing device operating independently, or may include two or more computing device operating in concert, in parallel, sequentially or the like; two or more computing devices may be included together in a single computing device or in two or more computing devices. Processor 104 may interface or communicate with one or more additional devices as described below in further detail via a network interface device. Network interface device may be utilized for connecting processor 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus, or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. Processor 104 may include but is not limited to, for example, a computing device or cluster of computing devices in a first location and a second computing device or cluster of computing devices in a second location. Processor 104 may include one or more computing devices dedicated to data storage, security, distribution of traffic for load balancing, and the like. Processor 104 may distribute one or more computing tasks as described below across a plurality of computing devices of computing device, which may operate in parallel, in series, redundantly, or in any other manner used for distribution of tasks or memory between computing devices. Processor 104 may be implemented using a "shared nothing" architecture in which data is cached at the worker, in an embodiment, this may enable scalability of apparatus 100 and/or computing device.

With continued reference to FIG. 1, processor 104 may be designed and/or configured to perform any method, method step, or sequence of method steps in any embodiment described in this disclosure, in any order and with any degree of repetition. For instance, processor 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Processor 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, apparatus 100 includes a memory. Memory is communicatively connected to processor 104. Memory may contain instructions configuring processor 104 to perform tasks disclosed in this disclosure. As used in this disclosure, "communicatively connected" means connected by way of a connection, attachment, or linkage between two or more relata which allows for reception and/or transmittance of information therebetween. For example, and without limitation, this connection may be wired or wireless, direct, or indirect, and between two or more components, circuits, devices, systems, apparatus, and the like, which allows for reception and/or transmittance of data and/or signal(s) therebetween. Data and/or signals therebetween may include, without limitation, electrical, electromagnetic, magnetic, video, audio, radio, and microwave data and/or signals, combinations thereof, and the like, among others. A communicative connection may be achieved, for example, and without limitation, through wired or wireless electronic, digital, or analog, communication, either directly or by way of one or more intervening devices or components. Further, communicative connection may include electrically coupling or connecting at least an output of one device, component, or circuit to at least an input of another device, component, or circuit. For example, without limitation, via a bus or other facility for intercommunication between elements of a computing device. Communicative connecting may also include indirect connections via, for example, and without limitation, wireless connection, radio communication, low power wide area network, optical communication, magnetic, capacitive, or optical coupling, and the like. In some instances, the terminology "communicatively coupled" may be used in place of communicatively connected in this disclosure.

With continued reference to FIG. 1, processor 104 is configured to receive a plurality of image data 108 from a user. As used in the current disclosure, "image data" refers to the visual information presented in a digital format. Image data 108 may include Image data 108 may take the form of images or pictures. In some cases, image data 108 may specifically refer to digital representations of handwritten text or characters. Image data 108 may be structured as a collection of images, each containing one or more handwritten character, word, or sentence. These images are often grayscale or color, depending on the application. This may include one or more handwritten signatures. Image data 108 includes a plurality of signature inputs 112. As used in the current disclosure, a "signature input" is a digital representation of a handwritten signature. The signature input 112 may be captured by writing on a paper and then scanning or photographing it, or directly using a digital device like a tablet with a stylus. Signature inputs 112 may contain a plurality of past and present examples of a user's handwritten signature. Signature inputs 112 may include historical signature inputs and current signature inputs. Some signature inputs 112 may involve cursive writing, where characters are connected in a flowing manner. Recognizing cursive handwriting may require advanced algorithms capable of understanding the contextual relationships between characters. As used in the current disclosure, a "historical signature input" is a signature input 112 that has been generated in the past. A historical signature input may refer to the preserved signature of an individual from the past, typically found on documents such as letters, legal documents, official decrees, artwork, receipts, and the like. In some cases, historical signature input may already be verified to be associated with the user. In an embodiment, historical signature inputs may be received from databases, API, the user, third parties, and the like. In some cases, signature inputs 112 may be received from handwriting databases. Handwriting databases are collections of handwriting samples from the user and perspective fraudulent users. These databases may include various handwriting styles, languages, and writing conditions to improve the robustness of processor 104. As used in the current disclosure, a "current signature input" is a signature input 112 that has been created in the present or the very near past. In some cases, the current signature input may be the signature input that is being evaluated for fraudulent use. Image data 108 representing signature inputs 112 are usually in common formats like JPEG, PNG, or TIFF. Signature inputs 112 may be gathered from the user from various sources.

With continued reference to FIG. 1, image data maybe be composed of a plurality of pixels, with each pixel containing color and brightness information. Each pixel may represent a single point in the image and contains information about its color and intensity. The combination of pixels creates the overall visual representation. Image data 108 may contain information regarding the resolution of the image. The resolution of an image refers to the number of pixels it contains. Higher resolution images have more pixels and can display more details. Common measures of resolution include width×height (e.g., 1920×1080 pixels for Full HD). Some image data 108 may use a combination of color channels to represent colors. For example, in RGB (Red, Green, Blue) color mode, each pixel has values for these three channels, allowing a wide range of colors to be displayed. Image data 108 may contain information related to color depth, or bit depth, refers to the number of bits used to represent each pixel's color. Higher bit depth allows for a greater variety of colors. Common color depths include 8-bit (256 colors), 16-bit, and 24-bit (true color). Image data 108 may be stored in various file formats such as JPEG, PNG, GIF, BMP, and TIFF. Each format has its own compression method, quality, and use cases. Image data 108 can also contain metadata, which includes information about the image, such as the date it was created, camera settings, and geolocation data. In an embodiment, image data 108 can be either grayscale (black and white) or color. Grayscale images have a single channel representing brightness, while color images have multiple channels for different colors. In an embodiment, to reduce file size, image data 108 may be compressed. Compression methods aim to maintain image quality while minimizing storage space. Common compression algorithms include JPEG compression for photographs and PNG for lossless compression.

With continued reference to FIG. 1, image data 108 may include a plurality of metadata. As used in the current disclosure, "metadata" refers to descriptive or informational data that provides details about the image data 108. Metadata may include descriptive metadata, wherein descriptive metadata is configured to describe the content, context, and structure of the data. This may include information such as time, geographic location, input type, and the like. Metadata may be used to describe how the image data 108 has been accessed, utilized, or created at a given time.

With continued reference to FIG. 1, processor 104 may be configured to receive image data 108 using an application programming interface (API). As used herein, an "application programming interface" is a set of functions that allow applications to access data and interact with external software components, operating systems, or microdevices, such as another web application or computing device. An API may define the methods and data formats that applications can use to request and exchange information. APIs enable seamless integration and functionality between different systems, applications, or platforms. An API may deliver image data 108 to apparatus 100 from a system/application that is associated with a user, medical provider, or other third-party custodian of user information. An API may be configured to query for web applications or other websites to retrieve image data 108 or other data associated with the user. An API may be further configured to filter through web applications according to a filter criterion. In this disclosure, "filter criterion" are conditions the web applications must fulfill in order to qualify for API. Web applications may be filtered based off these filter criteria. Filter criterion may include, without limitation, web application dates, web application traffic, web application types, web addresses, and the like. Once an API filters through web applications according to a filter criterion, it may select a web application. Processor 104 may transmit, through the API, image data 108 to apparatus 100. API may further automatically fill out user entry fields of the web application with the user credentials in order to gain access to the image data 108. Web applications may include, without limitation, a social media website, an online form, file scanning, email programs, third party websites, governmental websites, or the like.

With continued reference to FIG. 1, image data 108 may be generated using a web crawler. A "web crawler," as used herein, is a program that systematically browses the internet for the purpose of Web indexing. The web crawler may be seeded with platform URLs, wherein the crawler may then visit the next related URL, retrieve the content, index the content, and/or measures the relevance of the content to the topic of interest. In some embodiments, processor 104 may generate a web crawler to compile image data 108. The web crawler may be seeded and/or trained with a reputable website, such as the user's business website, to begin the search. A web crawler may be generated by a processor 104. In some embodiments, the web crawler may be trained with information received from a user through a user interface. In some embodiments, the web crawler may be configured to generate a web query. A web query may include search criteria received from a user. For example, a user may submit a plurality of websites for the web crawler to search to extract entity records, inventory records, financial records, human resource records, past image data 108, sales records, sales receipts, user handwriting samples, based on criteria such as a time, location, and the like.

With continued reference to FIG. 1, processor 104 is configured to identify a plurality of signature elements 116 as a function of the plurality of image data 108. As used in the current disclosure, "signature element" are various characteristics and features that are unique to each individual's signature. Identification of signature elements 116 may include identification of features such as stroke order and direction, pressure patterns (inferred from line thickness), speed (inferred from the fluidity of the signature), slant, size, spacing, contours, vertices, unique flourishes, and the like. As used in the current disclosure, a "contour" refers to the outlines or boundaries that define the shape of a signature in an image or a graphical representation. Contours may be the curves or lines that enclose a shape. In the context of a signature, contours may represent the boundary lines that define the outer limits of the signature strokes. As used in the current disclosure, "vertices" refer to the distinct points or corners that occur at the intersection of lines or curves within the signature. A vertex may be a point where two or more curves, lines, or edges meet. In the context of a signature, vertices may be the points where the strokes of the signature change direction. Processor 104 may employ image processing techniques, such as edge detection and contour analysis, to help in accurately isolating these features. These elements are crucial for identification, verification, and analysis purposes. For example, some signature elements 116 may only include initials while others use their full name. A signature element 116 may include the identification and analysis of the characteristics of a character, a portion of character, spacing between character, and the like. Signature elements 116 may be identified by isolating and evaluating the characteristics of each individual letter or a grouping of letters. This may include identifying the overall size and proportions of each letter in the signature. The overall size of the signature and the proportion of its elements (like the height of capital letters compared to lowercase letters) can reflect personality traits or stylistic preferences. For example, a user may have a signature with a large well defined first letter, while the remaining letters are much less defined. In some embodiments, signature elements 116 may include information related to the direction of the slant of a signature. The slant of the signature may refer to the orientation of the signature as it relates to the baseline. Signature elements 116 may include an identification of the angle of slant and the direction of the slant. This may include slants that are left, right, or vertical. Signature elements 116 may include information regarding the pressure that was used when creating the signature. The pressure used while signing, evident through the thickness and depth of the ink on the paper. In an embodiment, signature elements 116 may include the baseline orientation of the signature input 112. As used in the current disclosure, "baseline orientation" is the orientation of the signature along a baseline for which the signature rests. This may include considerations of whether the signature tends to ascend, descend, or stay level on an imaginary baseline. In an additional embodiment, signature elements 116 may include an analysis of letter formation. Letter formation may include information regarding the way individual letters are formed, including their shape and style. Letter formation may be distinctive to the individual. Letter formation may include considerations of the writing style and the language of the user. This may include evaluations of characteristics like cursive writing vs standard. This may additionally include evaluations Signature elements 116 may include an evaluation of the legibility of signature input. This may include how legible the signature is as it relates to the readability vs the abstractness of the signature. Signature elements 116 may include the identification and analysis of additional elements within a signature. For example, this may include underlines, dots, symbols, or elaborate flourishes.

With continued reference to FIG. 1, identifying the plurality of signature elements 116 may include identifying one or more characters within the signature inputs 112. As used in the current disclosure, a "character" is any letter, number, or symbol that appears within a signature. A character may additionally include alphanumeric characters, punctuation, emoji, drawings, and the like. In an embodiment, processor 104 may identify a single character or a group of characters using OCR or NLP, discussed in greater detail herein below. In some cases, processor 104 may be configured to identify a plurality of signature elements 116 associated with each character within the signature input 112.

Continuing to refer to FIG. 1, processor 104 may extract signature elements 116 from signature inputs 112 or other text using an optical character recognition system. Optical character recognition or optical character reader (OCR) may be applied upon submission of signature inputs 112 into processor 104 and includes automatic conversion of images of written information (e.g., typed, handwritten or printed text) into machine-encoded text. In some cases, recognition of at least a keyword from an image component may include one or more processes, including without limitation OCR, optical word recognition, intelligent character recognition, intelligent word recognition, and the like. In some cases, OCR may recognize written text, one glyph or character at a time. In some cases, optical word recognition may recognize written text, one word at a time, for example, for languages that use a space as a word divider. In some cases, intelligent character recognition (ICR) may recognize written text one glyph or character at a time, for instance by employing machine learning processes. In some cases, intelligent word recognition (IWR) may recognize written text, one word at a time, for instance by employing machine learning processes.

Still referring to FIG. 1, in some cases OCR may be an "offline" process, which analyses a static document or image frame. In some cases, handwriting movement analysis can be used as an input to a handwriting recognition software. For example, instead of merely using shapes of glyphs and words, this technique may capture motions, such as the order in which segments are drawn, the direction, and the pattern of putting the pen down and lifting it. This additional information can make handwriting recognition more accurate. In some cases, this technology may be referred to as "online" character recognition, dynamic character recognition, real-time character recognition, and intelligent character recognition.

Still referring to FIG. 1, in some cases, OCR processes may employ pre-processing of image component. Pre-processing process may include without limitation de-skew, de-speckle, binarization, line removal, layout analysis or "zoning," line and word detection, script recognition, character isolation or "segmentation," and normalization. In some cases, a de-skew process may include applying a transform (e.g., homography or affine transform) to image component to align text. In some cases, a de-speckle process may include removing positive and negative spots and/or smoothing edges. In some cases, a binarization process may include converting an image from color or greyscale to black-and-white (i.e., a binary image). Binarization may be performed as a simple way of separating text (or any other desired image component) from the background of image component. In some cases, binarization may be required for example if an employed OCR algorithm only works on binary images. In some cases, a line removal process may include removal of non-glyph or non-character imagery (e.g., boxes and lines). In some cases, a layout analysis or "zoning" process may identify columns, paragraphs, captions, and the like as distinct blocks. In some cases, a line and word detection process may establish a baseline for word and character shapes and separate words, if necessary. In some cases, a script recognition process may, for example in multilingual documents, identify script allowing an appropriate OCR algorithm to be selected. In some cases, a character isolation or "segmentation" process may separate signal characters, for example character-based OCR algorithms. In some cases, a normalization process may normalize aspect ratio and/or scale of image component.

Still referring to FIG. 1, in some embodiments an OCR process will include an OCR algorithm. Exemplary OCR algorithms include matrix matching process and/or feature extraction processes. Matrix matching may involve comparing an image to a stored glyph on a pixel-by-pixel basis. In some case, matrix matching may also be known as "pattern matching," "pattern recognition," and/or "image correlation." Matrix matching may rely on an input glyph being correctly isolated from the rest of the image component. Matrix matching may also rely on a stored glyph being in a similar font and at the same scale as input glyph. Matrix matching may work best with typewritten text.

Still referring to FIG. 1, in some embodiments, an OCR process may include a feature extraction process. In some cases, feature extraction may decompose a glyph into features. Exemplary non-limiting features may include corners, edges, lines, closed loops, line direction, line intersections, and the like. In some cases, feature extraction may reduce dimensionality of representation and may make the recognition process computationally more efficient. In some cases, extracted features can be compared with an abstract vector-like representation of a character, which might reduce to one or more glyph prototypes. General techniques of feature detection in computer vision are applicable to this type of OCR. In some embodiments, machine-learning processes like nearest neighbor classifiers (e.g., k-nearest neighbors algorithm) can be used to compare image features with stored glyph features and choose the nearest match. OCR may employ any machine-learning process described in this disclosure, for example machine-learning processes described with reference to FIG. 2. Exemplary non-limiting OCR software includes Cuneiform and Tesseract. Cuneiform is a multi-language, open-source optical character recognition system originally developed by Cognitive Technologies of Moscow, Russia. Tesseract is free OCR software originally developed by Hewlett-Packard of Palo Alto, California, United States.

Still referring to FIG. 1, in some cases, OCR may employ a two-pass approach to character recognition. Second pass may include adaptive recognition and use letter shapes recognized with high confidence on a first pass to recognize better remaining letters on the second pass. In some cases, two-pass approach may be advantageous for unusual fonts or low-quality image components where visual verbal content may be distorted. Another exemplary OCR software tool includes OCRopus. OCRopus development is led by German Research Centre for Artificial Intelligence in Kaiserslautern, Germany.

Still referring to FIG. 1, in some cases, OCR may include post-processing. For example, OCR accuracy can be increased, in some cases, if output is constrained by a lexicon. A lexicon may include a list or set of words that are allowed to occur in a document. In some cases, a lexicon may include, for instance, all the words in the English language, or a more technical lexicon for a specific field. In some cases, an output stream may be a plain text stream or file of characters. In some cases, an OCR process may preserve an original layout of visual verbal content. In some cases, near-neighbor analysis can make use of co-occurrence frequencies to correct errors, by noting that certain words are often seen together. For example, "Washington, D.C." is generally far more common in English than "Washington DOC." In some cases, an OCR process may make us of a priori knowledge of grammar for a language being recognized. For example, grammar rules may be used to help determine if a word is likely to be a verb or a noun. Distance conceptualization may be employed for recognition and classification. For example, a Levenshtein distance algorithm may be used in OCR post-processing to further optimize results.

With continued reference to FIG. 1, processor 104 may identify the plurality of signature elements 116 using a natural language processing model. As used in the current disclosure, a "natural language processing (NLP) model" is a computational model designed to process and understand human language. It leverages techniques from machine learning, linguistics, and computer science to enable computers to comprehend, interpret, and generate natural language text. The NLP model may preprocess the signature inputs 112, wherein the input text may include all text contained within the image data 108 its associated metadata, or any other data mentioned herein. Preprocessing the input text may involve tasks like tokenization (splitting text into individual words or sub-word units), normalizing the text (lowercasing, removing punctuation, etc.), and encoding the text into a numerical representation suitable for the model. The NLP model may include transformer architecture, wherein the transformers are deep learning models that employ attention mechanisms to capture the relationships between words or sub-word units in a text sequence. They consist of multiple layers of self-attention and feed-forward neural networks. The NLP model may weigh the importance of different words or sub-word units within a text sequence while considering the context. It enables the model to capture dependencies and relationships between words, considering both local and global contexts. This process may be used to identify a plurality of named entities. Language processing model may include a program automatically generated by processor 104 to produce associations between one or more characters extracted from the signature inputs 112 its associated metadata and detect associations, including without limitation mathematical associations, between such significant terms. Associations between language elements, where language elements include for purposes herein extracted significant terms, relationships of such categories to other such term may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted significant term indicates a given category of semantic meaning. As a further example, statistical correlations and/or mathematical associations may include probabilistic formulas or relationships indicating a positive and/or negative association between at least an extracted significant term and/or a given semantic relationship; positive or negative indication may include an indication that a given document is or is not indicating a category semantic relationship. Whether a phrase, sentence, word, or other textual element in the signature inputs 112 its associated metadata constitutes a positive or negative indicator may be determined, in an embodiment, by mathematical associations between detected significant terms, comparisons to phrases and/or words indicating positive and/or negative indicators that are stored in memory at processor 104, or the like.

With continued reference to FIG. 1, processor 104 may identify signature elements 116 using a signature machine-learning model. As used in the current disclosure, a "signature machine-learning model" is a machine-learning model that is configured to identify a plurality of signature elements 116. Signature machine-learning model may be consistent with the machine-learning model described below in FIG. 2. Inputs to the signature machine-learning model may include current signature inputs, historical signature inputs, signature inputs 112, image data 108, examples of signature elements 116, and the like. Outputs to the signature machine-learning model may include signature elements 116 tailored to the signature inputs 112. Signature training data may include a plurality of data entries containing a plurality of inputs that are correlated to a plurality of outputs for training a processor by a machine-learning process. In an embodiment, signature training data may include a plurality of signature inputs 112 correlated to examples of signature elements 116. Signature training data may be received from database 300. Signature training data may contain information about current signature inputs, historical signature inputs, signature inputs 112, image data 108, examples of signature elements 116, and the like. In an embodiment, signature training data may be iteratively updated as a function of the input and output results of past signature machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, signature machine leaning model may be used in tandem with the OCR. In an embodiment, signature machine leaning model may enhance the ability of the OCR to recognize and interpret text in image data 108. In some cases, signature training data may data take the form of large datasets of handwritten text. These datasets include various fonts, handwriting styles, text orientations, languages, and the like. In some cases, these datasets may include examples of varying degrees of signature elements 116. In a non-limiting example, the signature training data may include examples of signatures with varying baseline orientations. The training process involves feeding these images into the algorithm and adjusting it based on its ability to correctly recognize and translate the text. Over time, the algorithm may be configured to 'learn' to identify patterns and features that define different characters and words, improving its accuracy. This includes the ability to handle challenging scenarios like distorted text, cursive handwriting, and low-contrast images. The continuous learning aspect of machine learning means that OCR systems can adapt and improve over time, making them increasingly effective in converting a wide range of textual images into machine-readable text.

With continued reference to FIG. 1, processor 104 may determine a plurality of signature scores 120 as a function of the plurality of signature elements 116. As used in the current disclosure, a "signature score" is a quantitative assessment used to evaluate the unique characteristics and features of an individual's signature. This score may be generated by analyzing various aspects of a signature elements 116. Signature scores 120 may be generated based on the degree to which a character or group of characters reflect a characteristic described herein above in signature elements 116. These characteristics may include slant, size, spacing, baseline orientation, character formation, pressure, legibility, and the like. In an embodiment, a signature scores 120 may be calculated based upon the appearance of each signature element 116. For example, a signature element 116 that includes one or more well defined characters and a grouping of illegible characters. The signature score 120 may reflect the legibility of the well-defined characters and the illegible characters separately. A signature score 120 may be normalized. This may be done to bring all signature elements onto a comparable scale. This step is important to eliminate any bias introduced by different units or measurement scales. Normalization techniques can include min-max scaling, z-score normalization, or logarithmic transformation. In an embodiment, a signature score 120 may be expressed as a numerical score, a linguistic value, or an alphabetical score. A non-limiting example, of a numerical score, may include a scale from 1-10, 1-100, 1-1000, and the like, wherein a rating of 1 may represent the low end of the spectrum of a signature element 116, whereas a rating of 10 may represent the high end of the spectrum of a signature element 116. In another non-limiting example, linguistic values may include, "Strong Slant," "Moderate Slant," "No Slant," and the like. In some embodiments, linguistic values may correspond to a linguistic variable score range. For example, a signature element 116 that receives a score between 40-60, on a scale from 1-100, may be considered a "Moderate Slant." In an embodiment, a plurality of signature scores 120 may include a first set of signature scores and a second set of signature scores. As used in the current disclosure, a "first set of signature scores" are one or more signature scores 120 associated with signature elements 116 of historical signature inputs. As used in the current disclosure, a "second set of signature scores" are one or more signature scores 120 associated with the signature elements 116 of current signature inputs.

With continued reference to FIG. 1, determining a plurality of signature scores 120 may involve assigning a specific score to each characteristic of the signature elements 116 identified within the signature inputs 112. This approach may allow for a detailed and quantitative assessment of each aspect of the signature. In an embodiment, each characteristic of a signature element 116 may receive individual score. For example, the pressure used in a signature could have one score, while the legibility of the signature could have another. In an embodiment, processor 104 may be configured to generate a signature score 120 specifically for stroke order and direction, pressure patterns, speed, slant, character size and spacing, unique flourishes, baseline orientation, letter formation, legibility, vertices, contours, and the like. In a non-limiting example, processor 104 may be configured to generate a signature score 120 as a function of the slant of the signature. This may be done to quantify the degree to which the signature is slanted either left or right. Collectively, these individual scores for each characteristic across all signature elements may be aggregated and/or averaged to create a signature score 120. These scores can then be aggregated for an overall assessment or used in comparative analysis if multiple signature inputs are being examined. For instance, comparing scores of similar characteristics between two signatures can indicate the degree of similarity or difference.

With continued reference to FIG. 1, in one or more embodiments, determining plurality of signature scores 120 may include identifying a set of signature characteristics such as, without limitation, a set of geometric features. As a non-limiting example, processor 104 may be configured to load one or more images and for each image, processor 104 may check for its validity. For example, processor 104 may be configured to perform one or more image processing techniques as described herein on each loaded image upon a positive validation. Processor 104 may be configured to detect a plurality of contours within each image. For instance, and without limitation, identifying set of signature characteristics may include calculating a perimeter (i.e., a total distance around the contour's shape) and approximating, using the calculated perimeter, contour's shape of each of the plurality of contours. In some cases, contour's shape may include a polygonal representation; therefore, at least in part, a plurality of vertices and edges of both approximated contours and the original detected contours for each signature input may be identified and summed, by processor 104, as a function of the corresponding polygonal representation. Exemplary algorithm such as, without limitation, Ramer-Douglas-Peucker algorithm may be implemented by processor 104 in approximating the polygonal representation to simply the contour's shape by reducing the number of points required to represent it. In some cases, the degree of approximation may be determined as a function of a specific tolerance level; for example, and without limitation, a lower tolerance may result in a polygon that more closely resemble the original contour's shape, while a higher tolerance may produce a simpler polygon. As a non-limiting example, signature score may be determined as a function of a count of edges and sum of vertices. In some cases, such signature score may be indicative of an overall complexity and/or authenticity of a corresponding signature. In some cases, a more complex signature with more curves and turns may result in a polygon with more edges and vertices compared to a forged signature. In some cases, processor 104 may utilize one or more SQL queries to collect and rank potential fraud cases based on, for example, and without limitation, the set of geometric features. In one embodiment, one or more historical signatures may be selected from signature database and further ranked based on criteria that compare one or more geometric features against one or more thresholds suggestive of potential fraud pre-determined by the user. As a non-limiting example, a query identifying a pre-determined number of top suspects e.g., top 5, 10, 20, or more that have less than or equal to 4 contours and 140 vertices may be used to extract potential fraudulent signatures from signature database for cross-referencing with current signature inputs and/or further investigations as described in further detail below. It should be noted that historical signatures selected using such a query may include one or more signatures that were executed by individuals other than the purported signatory.

With continued reference to FIG. 1, processor 104 may generate a plurality of signature scores 120 using a score classifier 124. As used in the current disclosure, a "score classifier" is a classifier that is configured to generate a signature score 120. Score classifier 124 may be consistent with the classifier described below in FIG. 2. Inputs to the score classifier 124 may include current signature inputs, historical signature inputs, signature inputs 112, image data 108, signature elements 116, examples of signature scores 120, and the like. Outputs to the score classifier 124 may include plurality of signature scores 120 tailored to the signature elements 116. This may include a first set of signature scores and a second set of signature scores. Score training data 126 may include a plurality of data entries containing a plurality of inputs that are correlated to a plurality of outputs for training a processor by a machine-learning process. In an embodiment, score training data 126 may include a plurality of signature elements 116 correlated to examples of signature scores 120. Score training data 126 may be received from database 300 or a web crawler. In an embodiment, score training data 126 may include examples of signature elements 116 that have been previously scored. In an additional embodiment, score training data 126 may include a plurality of examples of signature inputs associated with the user or third parties. These examples of signature inputs may be used to train the score classifier 124 to identify and score signature elements 116. Score classifier 124 may be configured to assign a signature score 120 to the current or historical signature elements by comparing them to previously scored signature elements. In another embodiment, score training data 126 may contain information about current signature inputs, historical signature inputs, signature inputs 112, image data 108, signature elements 116, examples of signature scores 120, and the like. In an embodiment, score training data 126 may be iteratively updated as a function of the input and output results of past score classifier 124 or any other machine-learning model mentioned throughout this disclosure. The classifier may include, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, machine learning plays a crucial role in enhancing the function of software for generating a score classifier 124. This may include identifying patterns within the signature elements 116 that lead to changes in the capabilities and type of the score classifier 124. By analyzing vast amounts of data related to signature elements 116 and other handwriting samples, machine learning algorithms can identify patterns, correlations, and dependencies that contribute to a generating the score classifier 124. These algorithms can extract valuable insights from various sources, including handwritten text, signatures, and the like associated with signature elements 116. By applying machine learning techniques, the software can generate a score classifier 124 extremely accurately. Machine learning models may enable the software to learn from past collaborative experiences of the entities and iteratively improve its training data over time.

With continued reference to FIG. 1, processor 104 may be configured to update the training data of the score classifier 124 using user inputs. A score classifier 124 may use user input to update its training data, thereby improving its performance and accuracy. In embodiments, the score classifier 124 may be iteratively updated using input and output results of past iterations of the score classifier 124. The score classifier 124 may then be iteratively retrained using the updated score training data 126. For instance, and without limitation, score classifier 124 may be trained using first training data from, for example, and without limitation, training data from a user input or database. The score classifier 124 may then be updated by using previous inputs and outputs from the score classifier 124 as second training data to then train a second machine learning model. This process of updating the score classifier 124 and its associated training data may be continuously done to create subsequent score classifiers 124 to improve the speed and accuracy of the score classifier 124. When users interact with the software, their actions, preferences, and feedback provide valuable information that can be used to refine and enhance the model. This user input is collected and incorporated into the training data, allowing the machine learning model to learn from real-world interactions and adapt its predictions accordingly. By continually incorporating user input, the model becomes more responsive to user needs and preferences, capturing evolving trends and patterns. This iterative process of updating the training data with user input enables the machine learning model to deliver more personalized and relevant results, ultimately enhancing the overall user experience. The discussion within this paragraph may apply to both the score classifier 124 and/or any other machine-learning model/classifier discussed herein.

Incorporating the user feedback may include updating the training data by removing or adding correlations of user data to a path or resources as indicated by the feedback. Any machine-learning model as described herein may have the training data updated based on such feedback or data gathered using a web crawler as described above. For example, correlations in training data may be based on outdated information wherein, a web crawler may update such correlations based on more recent resources and information.

With continued reference to FIG. 1, processor 104 may use user feedback to train the machine-learning models and/or classifiers described above. For example, machine-learning models and/or classifiers may be trained using past inputs and outputs of classifier. In some embodiments, if user feedback indicates that an output of machine-learning models and/or classifiers was "bad," then that output and the corresponding input may be removed from training data used to train machine-learning models and/or classifiers, and/or may be replaced with a value entered by, e.g., another value that represents an ideal output given the input the machine learning model originally received, permitting use in retraining, and adding to training data; in either case, classifier may be retrained with modified training data as described in further detail below. In some embodiments, training data of classifier may include user feedback.

With continued reference to FIG. 1, in some embodiments, an accuracy score may be calculated for the machine-learning model and/or classifier using user feedback. For the purposes of this disclosure, "accuracy score," is a numerical value concerning the accuracy of a machine-learning model. For example, the accuracy/quality of the output of the score classifier 124 may be averaged to determine an accuracy score. In some embodiments, an accuracy score may be determined for the scoring of each signature element. Accuracy score or another score as described above may indicate a degree of retraining needed for a machine-learning model and/or classifier. Processor 104 may perform a larger number of retraining cycles for a higher number (or lower number, depending on a numerical interpretation used), and/or may collect more training data for such retraining. The discussion within this paragraph and the paragraphs preceding this paragraph may apply to both the score classifier and any other machine learning model discussed herein.

With continued reference to FIG. 1, processor 104 may be configured to identify one or more clusters. As used herein, a "cluster" is a collection of data points representing the aspects of a signature. A cluster may include a grouping of data points that represents a collection of similar or related data points within a dataset. In other words, a cluster may be a subset of data points that exhibit some degree of similarity or proximity to each other, while being distinct from other clusters in the dataset. Identification of clusters may be used to uncover patterns, structure, or relationships within a dataset such as signature elements 116. Clusters can be formed based on various criteria, such as proximity in the feature space or similarity in demand. By identifying clusters, processor 104 may gain insights into the underlying structure of the data and potentially discover meaningful patterns or subgroups within signature elements 116. In an embodiment, clusters may be generated as a function of the signature scores 120. In an embodiment, a cluster may include a graphical representation of one or more signature scores 120. This graphical representation may include one or more signature scores 120 may be plotted as a single point or a plurality of points representing two or more signature elements 116 associated with various signature inputs 112. Processor 104 may identify one or more clusters based on their similarity or homogeneity as it relates to the group of data points. A cluster may represent groups of data points that share similar characteristics or properties. In some cases, a processor 104 may identify grouping and subgroupings based on the identification of one or more clusters. Clusters may indicate the existence of distinct subpopulations or classes within the dataset. Clusters can reveal patterns or structures in the data that are not immediately apparent. By examining the characteristics of data points within a cluster, we may uncover relationships or associations that can be useful for further analysis or decision-making.

With continued reference to FIG. 1, processor 104 may be configured to identify one or more element clusters 128. As used in the current disclosure, an "element cluster" is a collection of data points associated with a signature element 116 of a user's signature. An element cluster 128 may refer to a grouping of specific features or characteristics within a signature. These clusters may represent subsets of signature elements 116 that share common attributes or are related in how they contribute to the uniqueness and authenticity of the signature. In an embodiment, element clusters 128 may be generated based on a first set of signature scores or a second set of signature scores. Specifically, an element cluster 128 may include a plurality of signature scores associated with individual signature elements of a signature input. In an embodiment, a first element cluster may be associated with the first set of signature scores while the second element cluster may be associated with the second set of signature scores. Elements clusters 128 may be a dataset containing information about how users how similar or dissimilar a group of signature elements 116 are. An element cluster 128 may group signature elements 116 together based on their proximity to one another. An element cluster 128 may be generated using various data-driven techniques and algorithms, such as cluster analysis, machine learning, and data mining.

With continued reference to FIG. 1, identifying an element cluster 128 may include plotting a signature scores 120 along a continuum. As used in the current disclosure, a "continuum" is a spectrum or a range of values, qualities, or attributes that exist along a single dimension or scale. A continuum may represent a continuous progression from one extreme to another, without any clear-cut boundaries or discrete categories. In a continuum, there are no distinct breakpoints or divisions, but instead, there is a gradual transition or progression from one end to the other. In some embodiments, a continuum may represent qualitative traits that exist on a spectrum. In a non-limiting example, a continuum may represent the degree of demand in a given market for one or more aspects of the process or procedures as reflected by one or more signature scores 120. A cluster may include a plurality of continuums, wherein each continuum represents one more trait or characteristic of a signature element 116. In some embodiments, multiple continuums may be combined to generate an XY axis or an XYZ axis.

With continued reference to FIG. 1, processor 104 may identify an element cluster 128 using a cluster machine-learning model. As used in the current disclosure, a "cluster machine-learning model" is a machine-learning model that is configured to generate element cluster 128. Cluster machine-learning model may be consistent with the machine-learning model described below in FIG. 2. Inputs to the cluster machine-learning model may include current signature inputs, historical signature inputs, signature inputs 112, image data 108, signature elements 116, signature scores 120, first set of signature scores, second set of signature scores, examples of element cluster 128, and the like. Outputs to the cluster machine-learning model may include element cluster 128 tailored to the plurality of signature scores 120. Cluster training data may include a plurality of data entries containing a plurality of inputs that are correlated to a plurality of outputs for training a processor by a machine-learning process. In an embodiment, cluster training data may include a plurality of plurality of signature scores 120 correlated to examples of element cluster 128. Cluster training data may be received from database 300. Cluster training data may contain information about current signature inputs, historical signature inputs, signature inputs 112, image data 108, signature elements 116, signature elements 116, signature scores 120, first set of signature scores, second set of signature scores, examples of element cluster 128, and the like. In an embodiment, cluster training data may be iteratively updated as a function of the input and output results of past cluster machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors machine-learning models, support vector machines, least squares support vector machines, fisher's linear discriminant, quadratic machine-learning models, decision trees, boosted trees, random forest machine-learning model, and the like.

With continued reference to FIG. 1, a cluster machine-learning model may include a feature learning algorithm. A "feature learning algorithm," as used herein, is a machine-learning algorithm that identifies associations between elements of data in a data set, which may include without limitation a training data set, where particular outputs and/or inputs are not specified. For instance, and without limitation, a feature learning algorithm may detect co-occurrences of elements of data, as defined above, with each other. As a non-limiting example, feature learning algorithms may detect co-occurrences of elements, as defined above, with each other. Computing devices may perform a feature learning algorithm by dividing elements or sets of data into various sub-combinations of such data to create new elements of data and evaluate which elements of data tend to co-occur with which other elements. In an embodiment, the first feature learning algorithm may perform clustering of data. The disclosure relating to a feature learning algorithm may be applied to any machine learning model disclosed herein.

Continuing refer to FIG. 1, a feature learning and/or clustering algorithm may be implemented, as a non-limiting example, using a k-means clustering algorithm. A "k-means clustering algorithm" as used in this disclosure, includes cluster analysis that partitions n observations or unclassified cluster data entries into k clusters in which each observation or unclassified cluster data entry belongs to the cluster with the nearest mean. "Cluster analysis" as used in this disclosure, includes grouping a set of observations or data entries in way that observations or data entries in the same group or cluster are more similar to each other than to those in other groups or clusters. Cluster analysis may be performed by various cluster models that include connectivity models such as hierarchical clustering, centroid models such as k-means, distribution models such as multivariate normal distribution, density models such as density-based spatial clustering of applications with nose (DBSCAN) and ordering points to identify the clustering structure (OPTICS), subspace models such as bi-clustering, group models, graph-based models such as a clique, signed graph models, neural models, and the like. Cluster analysis may include hard clustering whereby each observation or unclassified cluster data entry belongs to a cluster or not. Cluster analysis may include soft clustering or fuzzy clustering whereby each observation or unclassified cluster data entry belongs to each cluster to a certain degree such as for example a likelihood of belonging to a cluster; for instance, and without limitation, a fuzzy clustering algorithm may be used to identify clustering of elements of a first type or category with elements of a second type or category, and vice versa. Cluster analysis may include strict partitioning clustering whereby each observation or unclassified cluster data entry belongs to exactly one cluster. Cluster analysis may include strict partitioning clustering with outliers whereby observations or unclassified cluster data entries may belong to no cluster and may be considered outliers. Cluster analysis may include overlapping clustering whereby observations or unclassified cluster data entries may belong to more than one cluster. Cluster analysis may include hierarchical clustering whereby observations or unclassified cluster data entries that belong to a child cluster also belong to a parent cluster.

With continued reference to FIG. 1, computing device may generate a k-means clustering algorithm receiving unclassified data and outputs a definite number of classified data entry clusters wherein the data entry clusters each contain cluster data entries. K-means algorithm may select a specific number of groups or clusters to output, identified by a variable "k." Generating a k-means clustering algorithm includes assigning inputs containing unclassified data to a "k-group" or "k-cluster" based on feature similarity. Centroids of k-groups or k-clusters may be utilized to generate classified data entry cluster. K-means clustering algorithm may select and/or be provided "k" variable by calculating k-means clustering algorithm for a range of k values and comparing results. K-means clustering algorithm may compare results across different values of k as the mean distance between cluster data entries and cluster centroid. K-means clustering algorithm may calculate mean distance to a centroid as a function of k value, and the location of where the rate of decrease starts to sharply shift, this may be utilized to select a k value. Centroids of k-groups or k-cluster include a collection of feature values which are utilized to classify data entry clusters containing cluster data entries. K-means clustering algorithm may act to identify clusters of closely related data, which may be provided with user cohort labels; this may, for instance, generate an initial set of user cohort labels from an initial set of data, and may also, upon subsequent iterations, identify new clusters to be provided new labels, to which additional data may be classified, or to which previously used data may be reclassified.

With continued reference to FIG. 1, generating a k-means clustering algorithm may include generating initial estimates for k centroids which may be randomly generated or randomly selected from unclassified data input. K centroids may be utilized to define one or more clusters. K-means clustering algorithm may assign unclassified data to one or more k-centroids based on the squared Euclidean distance by first performing a data assigned step of unclassified data. K-means clustering algorithm may assign unclassified data to its nearest centroid based on the collection of centroids $c_i$ of centroids in set C. Unclassified data may be assigned to a cluster based on $\mathrm{argmin}_{c_i \ni c} \mathrm{dist}(c_i, x)^2$, where argmin includes argument of the minimum, ci includes a collection of centroids in a set C, and dist includes standard Euclidean distance. K-means clustering module may then recompute centroids by taking means of all cluster data entries assigned to a centroid's cluster. This may be calculated based on $ci=1/|Si|\Sigma xi \ni Si^{xi}$. K-means clustering algorithm may continue to repeat these calculations until a stopping criterion has been satisfied such as when cluster data entries do not change clusters, the sum of the distances have been minimized, and/or some maximum number of iterations has been reached.

Still referring to FIG. 1, k-means clustering algorithm may be configured to calculate a degree of similarity index value. A "degree of similarity index value" as used in this disclosure, includes a distance measurement indicating a measurement between each data entry cluster generated by k-means clustering algorithm and a selected element. Degree of similarity index value may indicate how close a particular combination of elements is to being classified by k-means algorithm to a particular cluster. K-means clustering algorithm may evaluate the distances of the combination of elements to the k-number of clusters output by k-means clustering algorithm. Short distances between an element of data and a cluster may indicate a higher degree of similarity between the element of data and a particular cluster. Longer distances between an element and a cluster may indicate a lower degree of similarity between an element to be compared and/or clustered and a particular cluster.

With continued reference to FIG. 1, k-means clustering algorithm selects a classified data entry cluster as a function of the degree of similarity index value. In an embodiment, k-means clustering algorithm may select a classified data entry cluster with the smallest degree of similarity index value indicating a high degree of similarity between an element and the data entry cluster. Alternatively or additionally k-means clustering algorithm may select a plurality of clusters having low degree of similarity index values to elements to be compared and/or clustered thereto, indicative of greater degrees of similarity. Degree of similarity index values may be compared to a threshold number indicating a minimal degree of relatedness suitable for inclusion of a set of element data in a cluster, where degree of similarity indices a-n falling under the threshold number may be included as indicative of high degrees of relatedness. The above-described illustration of feature learning using k-means clustering is included for illustrative purposes only and should not be construed as limiting potential implementation of feature learning algorithms; persons skilled in the art, upon reviewing the entirety of this disclosure, will be aware of various additional or alternative feature learning approaches that may be used consistently with this disclosure.

With continued reference to FIG. 1, processor 104 may be configured to generate an identification score as a function of the plurality of element clusters 128. As used in the current disclosure, an "identification score" quantifies the degree to which a given signature matches a known, authentic signature based on a detailed examination of its individual signature elements. In a first embodiment, the identification score may be quantified by measuring the distance between the centroids of a first and a second element cluster. A smaller distance might indicate a higher degree of similarity between the compared signatures. The centroid of an element clusters 128 may be the mean position of all the points in the cluster. To find a centroid, processor 104 may calculate the average position of all the elements in the cluster. Once the centroids of each cluster are identified, processor 104 may measure the distance between these centroids. This may be done using the Euclidean distance formula in the corresponding dimensional space. The measured distance may quantify the similarity or dissimilarity between the element clusters 128. A smaller distance may imply that the clusters are more similar or closely located, while a larger distance may indicate greater dissimilarity or dispersion. In another embodiment, the identification score may involve determining if one or more signature scores, associated with individual signature elements, would have membership within a specific element cluster 128. This could mean checking if certain signature traits match those commonly found in a particular cluster associated with authentic signatures. This may be done by determining the membership criteria, discussed in greater detail herein below, for each element cluster 128. Processor 104 may then determine in set of signature scores wholly or partially meets that membership criteria. In an embodiment, an identification score may be normalized. This may be done to bring all identification scores onto a comparable scale. This step is important to eliminate any bias introduced by different units or measurement scales. Normalization techniques can include min-max scaling, z-score normalization, or logarithmic transformation. In an embodiment, an identification score may be expressed as a numerical score, a linguistic value, or an alphabetical score. A non-limiting example, of a numerical score, may include a scale from −1 to 1, wherein a rating of 1 may represent a non-fraudulent signature input, whereas a rating of −1 may represent a fraudulent signature input. A rating of 0 may be determined to be an inconclusive result.

With continued reference to FIG. 1, processor 104 may generate identification scores using an identification machine-learning model. As used in the current disclosure, a "identification machine-learning model" is a machine-learning model that is configured to generate identification score. Identification machine-learning model may be consistent with the machine-learning model described below in FIG. 2. Inputs to the identification machine-learning model may include signature inputs, signature inputs 112, image data 108, signature elements 116, signature scores 120, first set of signature scores, second set of signature scores, element cluster 128, examples of identification scores, and the like. Outputs to the identification machine-learning model may include identification scores tailored to the plurality of element clusters 128. Identification training data may include a plurality of data entries containing a plurality of inputs that are correlated to a plurality of outputs for training a processor by a machine-learning process. In an embodiment, identification training data may include a plurality of a plurality of element clusters 128 correlated to examples of identification scores. Identification training data may be received from database 300. Identification training data may contain information about signature inputs, signature inputs 112, image data 108, signature elements 116, signature scores 120, first set of signature scores, second set of signature scores, element cluster 128, examples of identification score, and the like. In an embodiment, identification training data may be iteratively updated as a function of the input and output results of past identification machine-learning model or any other machine-learning model mentioned throughout this disclosure. The machine-learning model may be performed using, without limitation, linear machine-learning models such as without limitation logistic regression and/or naive Bayes machine-learning models, nearest neighbor machine-learning models such as k-nearest neighbors' machine-learning models, support vector machines, least squares support vector machines, fisher's linear discriminant, quadratic machine-learning models, decision trees, boosted trees, random forest machine-learning model, and the like.

Still referring to FIG. 1, processor 104 may be configured to generate a machine-learning model, such as identification machine-learning model, using a K-nearest neighbors (KNN) algorithm. A "K-nearest neighbors algorithm" as used in this disclosure, includes a classification method that utilizes feature similarity to analyze how closely out-of-sample-features resemble training data to classify input data to one or more clusters and/or categories of features as represented in training data; this may be performed by representing both training data and input data in vector forms, and using one or more measures of vector similarity to identify classifications within training data, and to determine a classification of input data. K-nearest neighbors algorithm may include specifying a K-value, or a number directing the classifier to select the k most similar entries training data to a given sample, determining the most common classifier of the entries in the database, and classifying the known sample; this may be performed recursively and/or iteratively to generate a classifier that may be used to classify input data as further samples. For instance, an initial set of samples may be performed to cover an initial heuristic and/or "first guess" at an output and/or relationship, which may be seeded, without limitation, using expert input received according to any process as described herein. As a non-limiting example, an initial heuristic may include a ranking of associations between inputs and elements of training data. Heuristic may include selecting some number of highest-ranking associations and/or training data elements.

With continued reference to FIG. 1, generating k-nearest neighbors algorithm may generate a first vector output containing a data entry cluster, generating a second vector output containing an input data, and calculate the distance between the first vector output and the second vector output using any suitable norm such as cosine similarity, Euclidean distance measurement, or the like. Each vector output may be represented, without limitation, as an n-tuple of values, where n is at least two values. Each value of n-tuple of values may represent a measurement or other quantitative value associated with a given category of data, or attribute, examples of which are provided in further detail below; a vector may be represented, without limitation, in n-dimensional space using an axis per category of value represented in n-tuple of values, such that a vector has a geometric direction characterizing the relative quantities of attributes in the n-tuple as compared to each other. Two vectors may be considered equivalent where their directions, and/or the relative quantities of values within each vector as compared to each other, are the same; thus, as a non-limiting example, a vector represented as [5, 10, 15] may be treated as equivalent, for purposes of this disclosure, as a vector represented as [1, 2, 3]. Vectors may be more similar where their directions are more similar, and more different where their directions are more divergent; however, vector similarity may alternatively or additionally be determined using averages of similarities between like attributes, or any other measure of similarity suitable for any n-tuple of values, or aggregation of numerical similarity measures for the purposes of loss functions as described in further detail below. Any vectors as described herein may be scaled, such that each vector represents each attribute along an equivalent scale of values. Each vector may be "normalized," or divided by a "length" attribute, such as a length attribute l as derived using a Pythagorean norm $$l = \sqrt{\sum_{i=0}^{n} a_i^2},$$

where $a_i$ is attribute number experience of the vector. Scaling and/or normalization may function to make vector comparison independent of absolute quantities of attributes, while preserving any dependency on the similarity of attributes; this may, for instance, be advantageous where cases represented in training data are represented by different quantities of samples, which may result in proportionally equivalent vectors with divergent values.

With continued reference to FIG. 1, processor 104 is configured to generate an accuracy threshold 132 as a function of the first set of signature scores. As used in the current disclosure, an "accuracy threshold" is a predefined value or criterion that determines the decision boundary between legitimate signature input and a fraudulent signature input. Generating an accuracy threshold 132 is important in ensuring the reliability and effectiveness of a signature verification system. This threshold is a predefined value that determines whether a signature is classified as genuine or forged. Processor 104 may analyze the distribution of signature scores 120 for both genuine and forged signatures. This could involve looking at mean scores, standard deviations, and other statistical measures. This may be done to identify patterns and overlaps in the scores of genuine and forged signatures. In an embodiment, processor 104 may generate an accuracy threshold 132 that accurately determines if a signature scores 120 that effectively differentiates between genuine and forged signatures. This threshold should ideally minimize both false positives (authentic signatures wrongly classified as forgeries) and false negatives (forgeries wrongly classified as authentic). The accuracy threshold 132 may be set as a fixed value, a percentile, or a more complex decision boundary if using advanced statistical or machine learning methods. Processor 104 may validate the chosen accuracy threshold 132 with a separate dataset, discussed in greater detail herein below, to test its effectiveness. Processor 104 may then adjust the accuracy threshold 132 based on validation results to improve accuracy. This might involve iterative testing and modification. In some cases, processor 104 may implement a safety margin around the threshold to account for near-matches. This margin can provide a buffer zone where signatures are flagged for additional review rather than being outright accepted or rejected. Processor 104 may iteratively update the accuracy threshold 132 based on new data, emerging forgery techniques, and changes in signature styles over time. This can be automated through machine learning algorithms that adaptively adjust the threshold.

With continued reference to FIG. 1, processor 104 may be configured to validate the accuracy of accuracy threshold 132 using a validation set or a test set. A validation set and a test set are two distinct datasets used to evaluate and refine the performance of the apparatus 100. Both sets are critical for ensuring the reliability and generalizability of the threshold. The validation set may be used to help fine-tune the parameters of the accuracy threshold 132. A validation set may consist of a collection of signatures that are separate from the training data. It may include a diverse mix of genuine signatures and forgeries. After identifying an accuracy threshold 132 the validation set is applied to the accuracy threshold 132 to assess its performance. The accuracy threshold may be adjusted based on the processor 104 ability to correctly classify signatures in the validation set as genuine or forged. A test set is used to evaluate the apparatus 100's performance. It provides an unbiased assessment of how well the apparatus and the established accuracy threshold generalize to new data. Like the validation set, the test set may be a collection of signatures (both genuine and forged) that the apparatus 100 has never seen before. It should be representative of the real-world scenarios in which the model will be used. After the model and threshold have been finalized using the training and validation sets, the test set is used to assess the model's effectiveness. The performance on the test set gives an indication of how the model will perform in practical applications.

With continued reference to FIG. 1, processor 104 may generate an accuracy threshold 132 based on identifying a membership criterion of the one or more element clusters 128. As used in the current disclosure, "membership criteria" is a set of specific rules or conditions that determine whether a given data point (in this case, a signature input 112) belongs to a particular cluster. These criteria are typically based on the features or characteristics that define the cluster. For example, signatures may be clustered based on features like stroke pressure, slant, size, and speed. A cluster for a particular individual's signature inputs 112 might include membership criteria like a slant angle between 30-45 degrees, average pressure above a certain threshold, and a specific range of height-to-width ratio. In an embodiment, an element cluster 128 may be defined its centroid (mean value of all points in the cluster) or by a range of values for each feature that represents the common characteristics of signature elements 116 in that cluster. A membership criterion may be quantification of how close a given signature score 120 is to a cluster. This could be a distance measure (like Euclidean distance) or a similarity index. In some clustering approaches, membership is not binary (in or out) but probabilistic. A set of signature scores may belong to multiple clusters with varying degrees of membership. This may be done using fuzzy clustering techniques. Processor 104 may use algorithms to define the criteria for cluster membership. This may involve setting thresholds (e.g., a specific value or range for a feature) or defining a boundary (like a centroid in k-means clustering). In other embodiments, processor 104 may quantify how close a data point is to a cluster, such as Euclidean distance for k-means or cosine similarity for text data.

With continued reference to FIG. 1, processor 104 is configured to determine one or more fraudulent signature inputs 136 from the plurality of signature inputs 112 as a function of a comparison of the second set of signature scores to the accuracy threshold 132. As used in the current disclosure, a "fraudulent signature input" refers to a signature that is not genuine and has been created with the intent to deceive or commit fraud. In various contexts, such as legal documents, financial transactions, or identity verification, signatures are a common method of authentication and agreement. A fraudulent signature input 136 may have may have been deliberately made to imitate someone else's signature. A forger may attempt to copy the style, flow, and characteristics of the authentic signature to make it appear legitimate. In some cases, a genuine signature might have been altered or manipulated after it has been made, which may also constitute a fraudulent signature input 136. A fraudulent signature input 136 may include instances were using a signature (even if it's a genuine copy) without the consent of the person it belongs to. Using mechanical means or digital technologies to replicate a person's signature without their approval may also be considered a fraudulent signature input 136. Processor 104 may identify a fraudulent signature input 136 by comparing signature scores 120 to the accuracy threshold 132. In an embodiment, this may include a comparison of whether each signature score 120 falls within the range of what is considered genuine. Processor 104 may alternatively identify a fraudulent signature input 136 may comparing the second set of signature scores to the element cluster 128. In an embodiment, if the second set of signature scores meets the membership criteria for the element cluster 128 the signature may be considered authentic. However, if the second set of signature scores fails to meet the membership criteria for the element cluster 128 the signature may be considered a fraudulent signature input 136. In a non-limiting example, if the second set of signature scores have been beyond a threshold distance from the centroid of the element cluster 128, the signature inputs 112 that are represented by the second set of signature scores may be labeled as fraudulent signature inputs 136. In an embodiment, signature inputs 112 whose scores deviate significantly from the accuracy threshold 132 may be flagged as potentially fraudulent. The degree of deviation required to flag a signature can vary based on system design and the level of security needed.

With continued reference to FIG. 1, processor 104 may be configured to generate a notification as a function of the identification of a fraudulent signature input 136. Upon flagging a fraudulent signature input 136, the apparatus 100 may then trigger a notification mechanism. This notification can take various forms, such as an email alert, a pop-up notification in a software application, a report to a monitoring team, push notification, audio alert, visual alert, haptic alert, and the like. The content of the notification may include details about the transaction or document in question, the nature of the suspected fraud, and potentially a visual representation of the signature for further examination. In some cases, the notification might also suggest next steps, like initiating a manual review process or temporarily suspending the associated transaction or account activity.

With continued reference to FIG. 1, identifying a fraudulent signature input 136 may be implemented as a fuzzy inferencing system. As used in the current disclosure, a "fuzzy inference" is a method that interprets the values in the input vector (i.e., a second set of signature scores and element cluster 128) and, based on a set of rules, assigns values to the output vector. A set of fuzzy rules may include a collection of linguistic variables that describe how the system should make a decision regarding classifying an input or controlling an output. An example of linguistic variables may include variables that represent one or more signature elements 116 of the second set of signature scores. Examples of linguistic variables may include terms such as "Full-No Slant," "Left Slant," and "Right Slant." A second set of signature scores and an element cluster 128 may each individually represent a fuzzy set. A fraudulent signature input 136 may be determined by a comparison of the degree of match between a first fuzzy set and a second fuzzy set, and/or single values therein with each other or with either set, which is sufficient for purposes of the matching process.

Still referring to FIG. 1, processor 104 may be configured to display the identification one or more fraudulent signature inputs 136 using a display device 140. As used in the current disclosure, a "display device" is a device that is used to display a plurality of data and other digital content. A display device 140 may include a user interface. A "user interface," as used herein, is a means by which a user and a computer system interact; for example through the use of input devices and software. A user interface may include a graphical user interface (GUI), command line interface (CLI), menu-driven user interface, touch user interface, voice user interface (VUI), form-based user interface, any combination thereof, and the like. A user interface may include a smartphone, smart tablet, desktop, or laptop operated by the user. In an embodiment, the user interface may include a graphical user interface. A "graphical user interface (GUI)," as used herein, is a graphical form of user interface that allows users to interact with electronic devices. In some embodiments, GUI may include icons, menus, other visual indicators, or representations (graphics), audio indicators such as primary notation, and display information and related user controls. A menu may contain a list of choices and may allow users to select one from them. A menu bar may be displayed horizontally across the screen such as pull-down menu. When any option is clicked in this menu, then the pulldown menu may appear. A menu may include a context menu that appears only when the user performs a specific action. An example of this is pressing the right mouse button. When this is done, a menu may appear under the cursor. Files, programs, web pages and the like may be represented using a small picture in a graphical user interface. For example, links to decentralized platforms as described in this disclosure may be incorporated using icons. Using an icon may be a fast way to open documents, run programs etc. because clicking on them yields instant access. Information contained in user interface may be directly influenced using graphical control elements such as widgets. A "widget," as used herein, is a user control element that allows a user to control and change the appearance of elements in the user interface. In this context a widget may refer to a generic GUI element such as a check box, button, or scroll bar to an instance of that element, or to a customized collection of such elements used for a specific function or application (such as a dialog box for users to customize their computer screen appearances). User interface controls may include software components that a user interacts with through direct manipulation to read or edit information displayed through user interface. Widgets may be used to display lists of related items, navigate the system using links, tabs, and manipulate data using check boxes, radio boxes, and the like.

Figure 2:
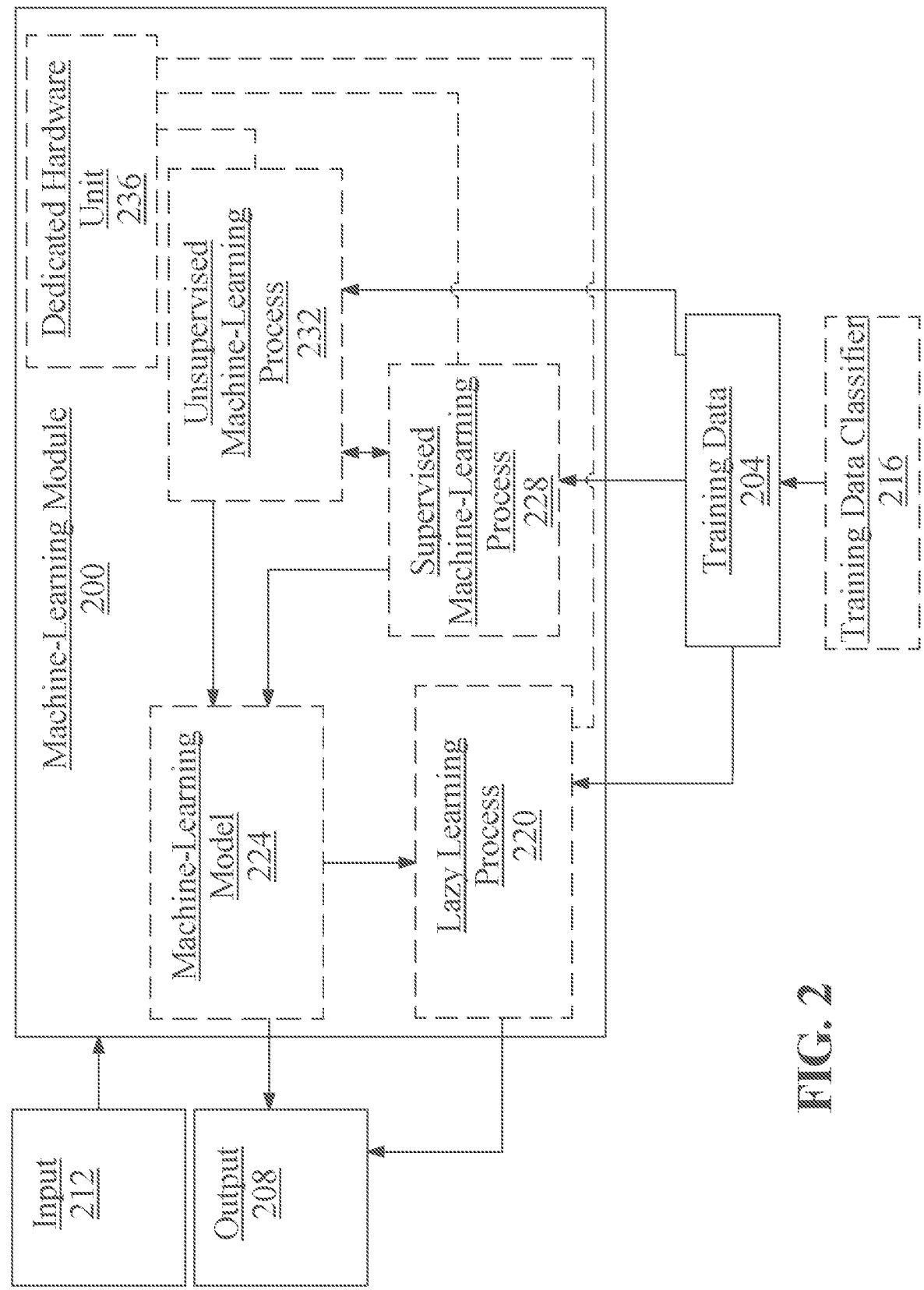
FIG. 2 is a block diagram of an exemplary machine-learning process.

Referring now to FIG. 2, an exemplary embodiment of a machine-learning module 200 that may perform one or more machine-learning processes as described in this disclosure is illustrated. Machine-learning module may perform determinations, classification, and/or analysis steps, methods, processes, or the like as described in this disclosure using machine learning processes. A "machine learning process," as used in this disclosure, is a process that automatedly uses training data 204 to generate an algorithm instantiated in hardware or software logic, data structures, and/or functions that will be performed by a computing device/module to produce outputs 208 given data provided as inputs 212; this is in contrast to a non-machine learning software program where the commands to be executed are determined in advance by a user and written in a programming language.

Still referring to FIG. 2, "training data," as used herein, is data containing correlations that a machine-learning process may use to model relationships between two or more categories of data elements. For instance, and without limitation, training data 204 may include a plurality of data entries, also known as "training examples," each entry representing a set of data elements that were recorded, received, and/or generated together; data elements may be correlated by shared existence in a given data entry, by proximity in a given data entry, or the like. Multiple data entries in training data 204 may evince one or more trends in correlations between categories of data elements; for instance, and without limitation, a higher value of a first data element belonging to a first category of data element may tend to correlate to a higher value of a second data element belonging to a second category of data element, indicating a possible proportional or other mathematical relationship linking values belonging to the two categories. Multiple categories of data elements may be related in training data 204 according to various correlations; correlations may indicate causative and/or predictive links between categories of data elements, which may be modeled as relationships such as mathematical relationships by machine-learning processes as described in further detail below. Training data 204 may be formatted and/or organized by categories of data elements, for instance by associating data elements with one or more descriptors corresponding to categories of data elements. As a non-limiting example, training data 204 may include data entered in standardized forms by persons or processes, such that entry of a given data element in a given field in a form may be mapped to one or more descriptors of categories. Elements in training data 204 may be linked to descriptors of categories by tags, tokens, or other data elements; for instance, and without limitation, training data 204 may be provided in fixed-length formats, formats linking positions of data to categories such as comma-separated value (CSV) formats and/or self-describing formats such as extensible markup language (XML), JavaScript Object Notation (JSON), or the like, enabling processes or devices to detect categories of data.

Alternatively or additionally, and continuing to refer to FIG. 2, training data 204 may include one or more elements that are not categorized; that is, training data 204 may not be formatted or contain descriptors for some elements of data. Machine-learning algorithms and/or other processes may sort training data 204 according to one or more categorizations using, for instance, natural language processing algorithms, tokenization, detection of correlated values in raw data and the like; categories may be generated using correlation and/or other processing algorithms. As a non-limiting example, in a corpus of text, phrases making up a number "n" of compound words, such as nouns modified by other nouns, may be identified according to a statistically significant prevalence of n-grams containing such words in a particular order; such an n-gram may be categorized as an element of language such as a "word" to be tracked similarly to single words, generating a new category as a result of statistical analysis. Similarly, in a data entry including some textual data, a person's name may be identified by reference to a list, dictionary, or other compendium of terms, permitting ad-hoc categorization by machine-learning algorithms, and/or automated association of data in the data entry with descriptors or into a given format. The ability to categorize data entries automatedly may enable the same training data 204 to be made applicable for two or more distinct machine-learning algorithms as described in further detail below. Training data 204 used by machine-learning module 200 may correlate any input data as described in this disclosure to any output data as described in this disclosure. As a non-limiting illustrative example plurality of signature elements 116 as inputs correlated to examples of signature scores 120 as outputs.

Further referring to FIG. 2, training data may be filtered, sorted, and/or selected using one or more supervised and/or unsupervised machine-learning processes and/or models as described in further detail below; such models may include without limitation a training data classifier 216. Training data classifier 216 may include a "classifier," which as used in this disclosure is a machine-learning model as defined below, such as a data structure representing and/or using a mathematical model, neural net, or program generated by a machine learning algorithm known as a "classification algorithm," as described in further detail below, that sorts inputs into categories or bins of data, outputting the categories or bins of data and/or labels associated therewith. A classifier may be configured to output at least a datum that labels or otherwise identifies a set of data that are clustered together, found to be close under a distance metric as described below, or the like. A distance metric may include any norm, such as, without limitation, a Pythagorean norm. Machine-learning module 200 may generate a classifier using a classification algorithm, defined as a process whereby a computing device and/or any module and/or component operating thereon derives a classifier from training data 204. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. As a non-limiting example, training data classifier 216 may classify elements of training data to various characteristics of signature elements 116 such as baseline orientation, slant, and the like.

With further reference to FIG. 2, training examples for use as training data may be selected from a population of potential examples according to cohorts relevant to an analytical problem to be solved, a classification task, or the like. Alternatively or additionally, training data may be selected to span a set of likely circumstances or inputs for a machine-learning model and/or process to encounter when deployed. For instance, and without limitation, for each category of input data to a machine-learning process or model that may exist in a range of values in a population of phenomena such as images, user data, process data, physical data, or the like, a computing device, processor, and/or machine-learning model may select training examples representing each possible value on such a range and/or a representative sample of values on such a range. Selection of a representative sample may include selection of training examples in proportions matching a statistically determined and/or predicted distribution of such values according to relative frequency, such that, for instance, values encountered more frequently in a population of data so analyzed are represented by more training examples than values that are encountered less frequently. Alternatively or additionally, a set of training examples may be compared to a collection of representative values in a database and/or presented to a user, so that a process can detect, automatically or via user input, one or more values that are not included in the set of training examples. Computing device, processor, and/or module may automatically generate a missing training example; this may be done by receiving and/or retrieving a missing input and/or output value and correlating the missing input and/or output value with a corresponding output and/or input value collocated in a data record with the retrieved value, provided by a user and/or other device, or the like.

Still referring to FIG. 2, computer, processor, and/or module may be configured to sanitize training data. "Sanitizing" training data, as used in this disclosure, is a process whereby training examples are removed that interfere with convergence of a machine-learning model and/or process to a useful result. For instance, and without limitation, a training example may include an input and/or output value that is an outlier from typically encountered values, such that a machine-learning algorithm using the training example will be adapted to an unlikely amount as an input and/or output; a value that is more than a threshold number of standard deviations away from an average, mean, or expected value, for instance, may be eliminated. Alternatively or additionally, one or more training examples may identify as having poor quality data, where "poor quality" is defined as having a signal to noise ratio below a threshold value.

As a non-limiting example, and with further reference to FIG. 2, images used to train an image classifier or other machine-learning model and/or process that takes images as inputs or generates images as outputs may be rejected if image quality is below a threshold value. For instance, and without limitation, computing device, processor, and/or module may perform blur detection, and eliminate one or more Blur detection may be performed, as a non-limiting example, by taking Fourier transform, or an approximation such as a Fast Fourier Transform (FFT) of the image and analyzing a distribution of low and high frequencies in the resulting frequency-domain depiction of the image; numbers of high-frequency values below a threshold level may indicate blurriness. As a further non-limiting example, detection of blurriness may be performed by convolving an image, a channel of an image, or the like with a Laplacian kernel; this may generate a numerical score reflecting a number of rapid changes in intensity shown in the image, such that a high score indicates clarity, and a low score indicates blurriness. Blurriness detection may be performed using a gradient-based operator, which measures operators based on the gradient or first derivative of an image, based on the hypothesis that rapid changes indicate sharp edges in the image, and thus are indicative of a lower degree of blurriness. Blur detection may be performed using Wavelet-based operator, which takes advantage of the capability of coefficients of the discrete wavelet transform to describe the frequency and spatial content of images. Blur detection may be performed using statistics-based operators take advantage of several image statistics as texture descriptors in order to compute a focus level. Blur detection may be performed by using discrete cosine transform (DCT) coefficients in order to compute a focus level of an image from its frequency content.

Continuing to refer to FIG. 2, computing device, processor, and/or module may be configured to precondition one or more training examples. For instance, and without limitation, where a machine learning model and/or process has one or more inputs and/or outputs requiring, transmitting, or receiving a certain number of bits, samples, or other units of data, one or more training examples' elements to be used as or compared to inputs and/or outputs may be modified to have such a number of units of data. For instance, a computing device, processor, and/or module may convert a smaller number of units, such as in a low pixel count image, into a desired number of units, for instance by upsampling and interpolating. As a non-limiting example, a low pixel count image may have 100 pixels, however a desired number of pixels may be 128. Processor may interpolate the low pixel count image to convert the 100 pixels into 128 pixels. It should also be noted that one of ordinary skill in the art, upon reading this disclosure, would know the various methods to interpolate a smaller number of data units such as samples, pixels, bits, or the like to a desired number of such units. In some instances, a set of interpolation rules may be trained by sets of highly detailed inputs and/or outputs and corresponding inputs and/or outputs downsampled to smaller numbers of units, and a neural network or other machine learning model that is trained to predict interpolated pixel values using the training data. As a non-limiting example, a sample input and/or output, such as a sample picture, with sample-expanded data units (e.g., pixels added between the original pixels) may be input to a neural network or machine-learning model and output a pseudo replica sample-picture with dummy values assigned to pixels between the original pixels based on a set of interpolation rules. As a non-limiting example, in the context of an image classifier, a machine-learning model may have a set of interpolation rules trained by sets of highly detailed images and images that have been downsampled to smaller numbers of pixels, and a neural network or other machine learning model that is trained using those examples to predict interpolated pixel values in a facial picture context. As a result, an input with sample-expanded data units (the ones added between the original data units, with dummy values) may be run through a trained neural network and/or model, which may fill in values to replace the dummy values. Alternatively or additionally, processor, computing device, and/or module may utilize sample expander methods, a low-pass filter, or both. As used in this disclosure, a "low-pass filter" is a filter that passes signals with a frequency lower than a selected cutoff frequency and attenuates signals with frequencies higher than the cutoff frequency. The exact frequency response of the filter depends on the filter design. Computing device, processor, and/or module may use averaging, such as luma or chroma averaging in images, to fill in data units in between original data units.

In some embodiments, and with continued reference to FIG. 2, computing device, processor, and/or module may down-sample elements of a training example to a desired lower number of data elements. As a non-limiting example, a high pixel count image may have 256 pixels, however a desired number of pixels may be 128. Processor may downsample the high pixel count image to convert the 256 pixels into 128 pixels. In some embodiments, processor may be configured to perform downsampling on data. Downsampling, also known as decimation, may include removing every Nth entry in a sequence of samples, all but every Nth entry, or the like, which is a process known as "compression," and may be performed, for instance by an N-sample compressor implemented using hardware or software. Antialiasing and/or anti-imaging filters, and/or low-pass filters, may be used to clean up side-effects of compression.

Still referring to FIG. 2, machine-learning module 200 may be configured to perform a lazy-learning process 220 and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data 204. Heuristic may include selecting some number of highest-ranking associations and/or training data 204 elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

Alternatively or additionally, and with continued reference to FIG. 2, machine-learning processes as described in this disclosure may be used to generate machine-learning models 224. A "machine-learning model," as used in this disclosure, is a data structure representing and/or instantiating a mathematical and/or algorithmic representation of a relationship between inputs and outputs, as generated using any machine-learning process including without limitation any process as described above, and stored in memory; an input is submitted to a machine-learning model 224 once created, which generates an output based on the relationship that was derived. For instance, and without limitation, a linear regression model, generated using a linear regression algorithm, may compute a linear combination of input data using coefficients derived during machine-learning processes to calculate an output datum. As a further non-limiting example, a machine-learning model 224 may be generated by creating an artificial neural network, such as a convolutional neural network comprising an input layer of nodes, one or more intermediate layers, and an output layer of nodes. Connections between nodes may be created via the process of "training" the network, in which elements from a training data 204 set are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

Still referring to FIG. 2, machine-learning algorithms may include at least a supervised machine-learning process 228. At least a supervised machine-learning process 228, as defined herein, include algorithms that receive a training set relating a number of inputs to a number of outputs, and seek to generate one or more data structures representing and/or instantiating one or more mathematical relations relating inputs to outputs, where each of the one or more mathematical relations is optimal according to some criterion specified to the algorithm using some scoring function. For instance, a supervised learning algorithm may include signature elements 116 as described above as inputs, signature scores 120 as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data 204. Persons skilled in the art, upon reviewing the entirety of this disclosure, will be aware of various possible variations of at least a supervised machine-learning process 228 that may be used to determine relation between inputs and outputs. Supervised machine-learning processes may include classification algorithms as defined above.

With further reference to FIG. 2, training a supervised machine-learning process may include, without limitation, iteratively updating coefficients, biases, weights based on an error function, expected loss, and/or risk function. For instance, an output generated by a supervised machine-learning model using an input example in a training example may be compared to an output example from the training example; an error function may be generated based on the comparison, which may include any error function suitable for use with any machine-learning algorithm described in this disclosure, including a square of a difference between one or more sets of compared values or the like. Such an error function may be used in turn to update one or more weights, biases, coefficients, or other parameters of a machine-learning model through any suitable process including without limitation gradient descent processes, least-squares processes, and/or other processes described in this disclosure. This may be done iteratively and/or recursively to gradually tune such weights, biases, coefficients, or other parameters. Updating may be performed, in neural networks, using one or more back-propagation algorithms. Iterative and/or recursive updates to weights, biases, coefficients, or other parameters as described above may be performed until currently available training data is exhausted and/or until a convergence test is passed, where a "convergence test" is a test for a condition selected as indicating that a model and/or weights, biases, coefficients, or other parameters thereof has reached a degree of accuracy. A convergence test may, for instance, compare a difference between two or more successive errors or error function values, where differences below a threshold amount may be taken to indicate convergence. Alternatively or additionally, one or more errors and/or error function values evaluated in training iterations may be compared to a threshold.

Still referring to FIG. 2, a computing device, processor, and/or module may be configured to perform method, method step, sequence of method steps and/or algorithm described in reference to this figure, in any order and with any degree of repetition. For instance, a computing device, processor, and/or module may be configured to perform a single step, sequence and/or algorithm repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. A computing device, processor, and/or module may perform any step, sequence of steps, or algorithm in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

Further referring to FIG. 2, machine learning processes may include at least an unsupervised machine-learning processes 232. An unsupervised machine-learning process, as used herein, is a process that derives inferences in datasets without regard to labels; as a result, an unsupervised machine-learning process may be free to discover any structure, relationship, and/or correlation provided in the data. Unsupervised processes 232 may not require a response variable; unsupervised processes 232 may be used to find interesting patterns and/or inferences between variables, to determine a degree of correlation between two or more variables, or the like.

Still referring to FIG. 2, machine-learning module 200 may be designed and configured to create a machine-learning model 224 using techniques for development of linear regression models. Linear regression models may include ordinary least squares regression, which aims to minimize the square of the difference between predicted outcomes and actual outcomes according to an appropriate norm for measuring such a difference (e.g., a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 2, machine-learning algorithms may include, without limitation, linear discriminant analysis. Machine-learning algorithm may include quadratic discriminant analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include various forms of latent space regularization such as variational regularization. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized trees, AdaBoost, gradient tree boosting, and/or voting classifier methods. Machine-learning algorithms may include neural net algorithms, including convolutional neural net processes.

Still referring to FIG. 2, a machine-learning model and/or process may be deployed or instantiated by incorporation into a program, apparatus, system and/or module. For instance, and without limitation, a machine-learning model, neural network, and/or some or all parameters thereof may be stored and/or deployed in any memory or circuitry. Parameters such as coefficients, weights, and/or biases may be stored as circuit-based constants, such as arrays of wires and/or binary inputs and/or outputs set at logic "1" and "0" voltage levels in a logic circuit to represent a number according to any suitable encoding system including twos complement or the like or may be stored in any volatile and/or non-volatile memory. Similarly, mathematical operations and input and/or output of data to or from models, neural network layers, or the like may be instantiated in hardware circuitry and/or in the form of instructions in firmware, machine-code such as binary operation code instructions, assembly language, or any higher-order programming language. Any technology for hardware and/or software instantiation of memory, instructions, data structures, and/or algorithms may be used to instantiate a machine-learning process and/or model, including without limitation any combination of production and/or configuration of non-reconfigurable hardware elements, circuits, and/or modules such as without limitation ASICs, production and/or configuration of reconfigurable hardware elements, circuits, and/or modules such as without limitation FPGAs, production and/or of non-reconfigurable and/or configuration non-rewritable memory elements, circuits, and/or modules such as without limitation non-rewritable ROM, production and/or configuration of reconfigurable and/or rewritable memory elements, circuits, and/or modules such as without limitation rewritable ROM or other memory technology described in this disclosure, and/or production and/or configuration of any computing device and/or component thereof as described in this disclosure. Such deployed and/or instantiated machine-learning model and/or algorithm may receive inputs from any other process, module, and/or component described in this disclosure, and produce outputs to any other process, module, and/or component described in this disclosure.

Continuing to refer to FIG. 2, any process of training, retraining, deployment, and/or instantiation of any machine-learning model and/or algorithm may be performed and/or repeated after an initial deployment and/or instantiation to correct, refine, and/or improve the machine-learning model and/or algorithm. Such retraining, deployment, and/or instantiation may be performed as a periodic or regular process, such as retraining, deployment, and/or instantiation at regular elapsed time periods, after some measure of volume such as a number of bytes or other measures of data processed, a number of uses or performances of processes described in this disclosure, or the like, and/or according to a software, firmware, or other update schedule. Alternatively or additionally, retraining, deployment, and/or instantiation may be event-based, and may be triggered, without limitation, by user inputs indicating sub-optimal or otherwise problematic performance and/or by automated field testing and/or auditing processes, which may compare outputs of machine-learning models and/or algorithms, and/or errors and/or error functions thereof, to any thresholds, convergence tests, or the like, and/or may compare outputs of processes described herein to similar thresholds, convergence tests or the like. Event-based retraining, deployment, and/or instantiation may alternatively or additionally be triggered by receipt and/or generation of one or more new training examples; a number of new training examples may be compared to a preconfigured threshold, where exceeding the preconfigured threshold may trigger retraining, deployment, and/or instantiation.

Still referring to FIG. 2, retraining and/or additional training may be performed using any process for training described above, using any currently or previously deployed version of a machine-learning model and/or algorithm as a starting point. Training data for retraining may be collected, preconditioned, sorted, classified, sanitized, or otherwise processed according to any process described in this disclosure. Training data may include, without limitation, training examples including inputs and correlated outputs used, received, and/or generated from any version of any system, module, machine-learning model or algorithm, apparatus, and/or method described in this disclosure; such examples may be modified and/or labeled according to user feedback or other processes to indicate desired results, and/or may have actual or measured results from a process being modeled and/or predicted by system, module, machine-learning model or algorithm, apparatus, and/or method as "desired" results to be compared to outputs for training processes as described above.

Redeployment may be performed using any reconfiguring and/or rewriting of reconfigurable and/or rewritable circuit and/or memory elements; alternatively, redeployment may be performed by production of new hardware and/or software components, circuits, instructions, or the like, which may be added to and/or may replace existing hardware and/or software components, circuits, instructions, or the like.

Further referring to FIG. 2, one or more processes or algorithms described above may be performed by at least a dedicated hardware unit 236. A "dedicated hardware unit," for the purposes of this figure, is a hardware component, circuit, or the like, aside from a principal control circuit and/or processor performing method steps as described in this disclosure, that is specifically designated or selected to perform one or more specific tasks and/or processes described in reference to this figure, such as without limitation preconditioning and/or sanitization of training data and/or training a machine-learning algorithm and/or model.

A dedicated hardware unit 236 may include, without limitation, a hardware unit that can perform iterative or massed calculations, such as matrix-based calculations to update or tune parameters, weights, coefficients, and/or biases of machine-learning models and/or neural networks, efficiently using pipelining, parallel processing, or the like; such a hardware unit may be optimized for such processes by, for instance, including dedicated circuitry for matrix and/or signal processing operations that includes, e.g., multiple arithmetic and/or logical circuit units such as multipliers and/or adders that can act simultaneously and/or in parallel or the like. Such dedicated hardware units 236 may include, without limitation, graphical processing units (GPUs), dedicated signal processing modules, FPGA or other reconfigurable hardware that has been configured to instantiate parallel processing units for one or more specific tasks, or the like, A computing device, processor, apparatus, or module may be configured to instruct one or more dedicated hardware units 236 to perform one or more operations described herein, such as evaluation of model and/or algorithm outputs, one-time or iterative updates to parameters, coefficients, weights, and/or biases, and/or any other operations such as vector and/or matrix operations as described in this disclosure.

Figure 3:
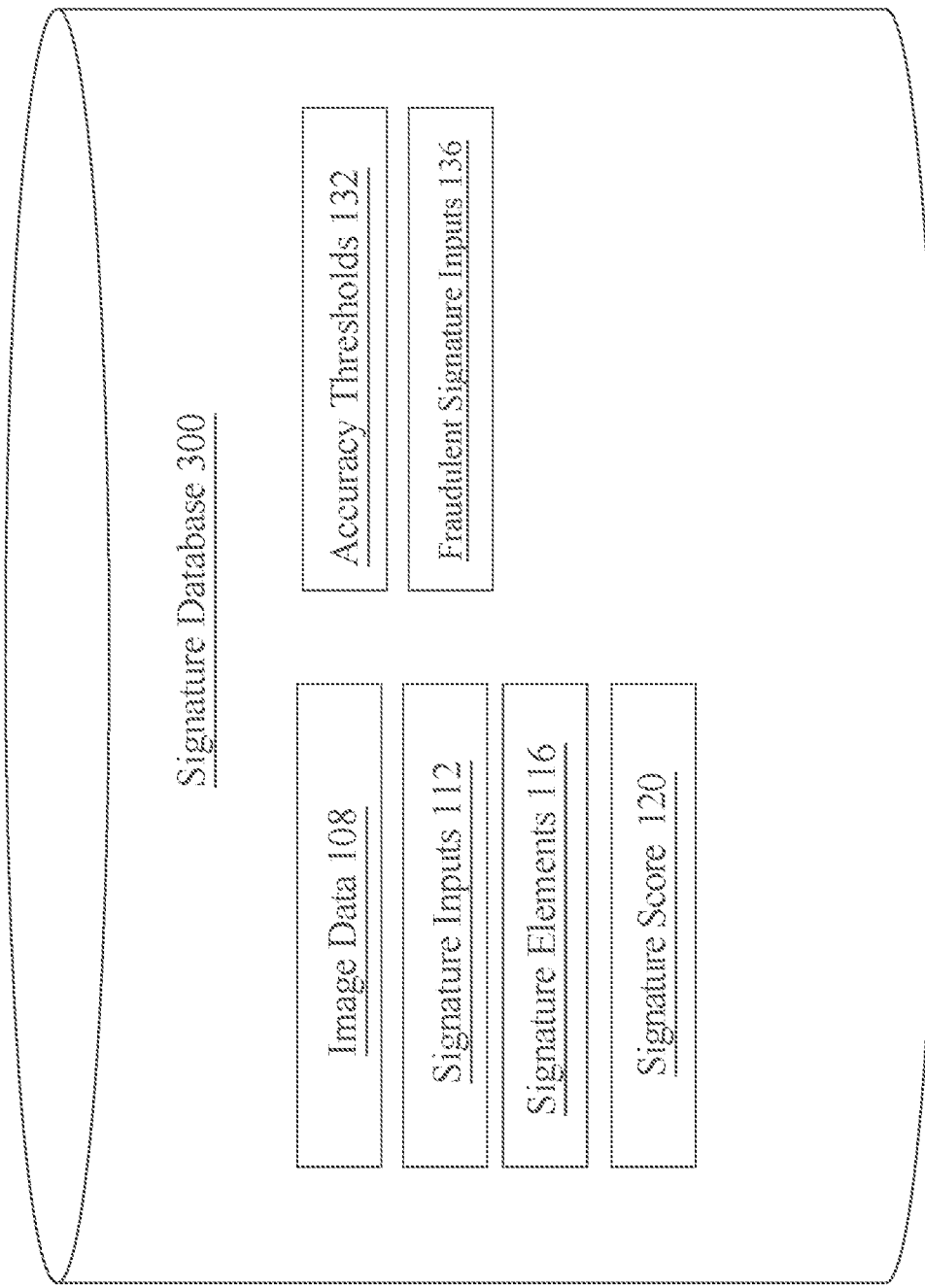
FIG. 3 is a block diagram of an exemplary embodiment of a signature database.

Now referring to FIG. 3, an exemplary signature database 300 is illustrated by way of block diagram. In an embodiment, any past or present versions of any data disclosed herein may be stored within the signature database 300 including but not limited to: current signature inputs, historical signature inputs, signature inputs 112, image data 108, signature elements 116, signature elements 116, signature scores 120, first set of signature scores, second set of signature scores, examples of element cluster 128, handwriting samples, user specific handwriting samples, one or more fraudulent signature inputs 136, and the like. Processor 104 may be communicatively connected with signature database 300. For example, in some cases, database 300 may be local to processor 104. Alternatively or additionally, in some cases, database 300 may be remote to processor 104 and communicative with processor 104 by way of one or more networks. Network may include, but not limited to, a cloud network, a mesh network, or the like. By way of example, a "cloud-based" system, as that term is used herein, can refer to a system which includes software and/or data which is stored, managed, and/or processed on a network of remote servers hosted in the "cloud," e.g., via the Internet, rather than on local severs or personal computers. A "mesh network" as used in this disclosure is a local network topology in which the infrastructure processor 104 connects directly, dynamically, and non-hierarchically to as many other computing devices as possible. A "network topology" as used in this disclosure is an arrangement of elements of a communication network. signature database 300 may be implemented, without limitation, as a relational database, a key-value retrieval database such as a NOSQL database, or any other format or structure for use as a database that a person skilled in the art would recognize as suitable upon review of the entirety of this disclosure. signature database 300 may alternatively or additionally be implemented using a distributed data storage protocol and/or data structure, such as a distributed hash table or the like. signature database 300 may include a plurality of data entries and/or records as described above. Data entries in a database may be flagged with or linked to one or more additional elements of information, which may be reflected in data entry cells and/or in linked tables such as tables related by one or more indices in a relational database. Persons skilled in the art, upon reviewing the entirety of this disclosure, will be aware of various ways in which data entries in a database may store, retrieve, organize, and/or reflect data and/or records as used herein, as well as categories and/or populations of data consistently with this disclosure.

Figure 4:
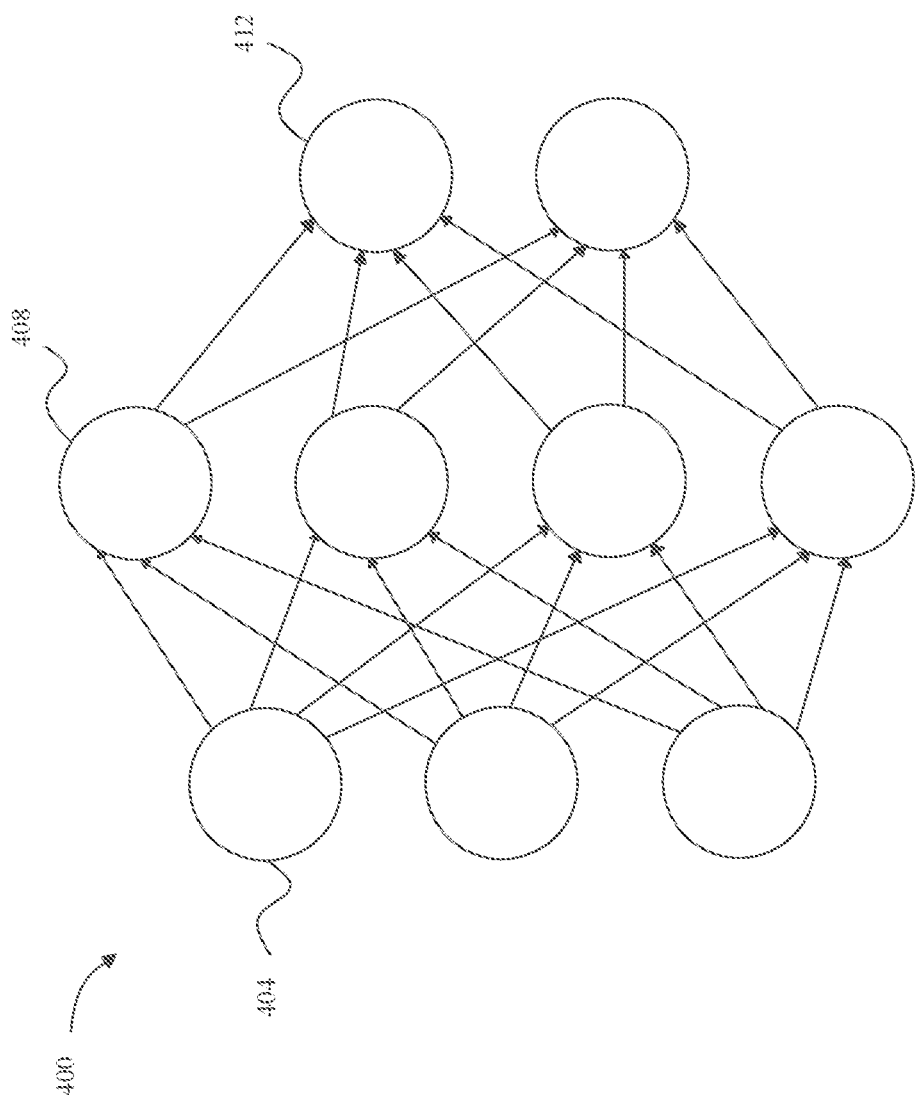
FIG. 4 is a diagram of an exemplary embodiment of a neural network.

Referring now to FIG. 4, an exemplary embodiment of neural network 400 is illustrated. A neural network 400, also known as an artificial neural network, is a network of "nodes," or data structures having one or more inputs, one or more outputs, and a function determining outputs based on inputs. Such nodes may be organized in a network, such as without limitation a convolutional neural network, including an input layer of nodes 404, one or more intermediate layers 408, and an output layer of nodes 412. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. Connections may run solely from input nodes toward output nodes in a "feed-forward" network or may feed outputs of one layer back to inputs of the same or a different layer in a "recurrent network." As a further non-limiting example, a neural network may include a convolutional neural network comprising an input layer of nodes, one or more intermediate layers, and an output layer of nodes. A "convolutional neural network," as used in this disclosure, is a neural network in which at least one hidden layer is a convolutional layer that convolves inputs to that layer with a subset of inputs known as a "kernel," along with one or more additional layers such as pooling layers, fully connected layers, and the like.

Figure 5:
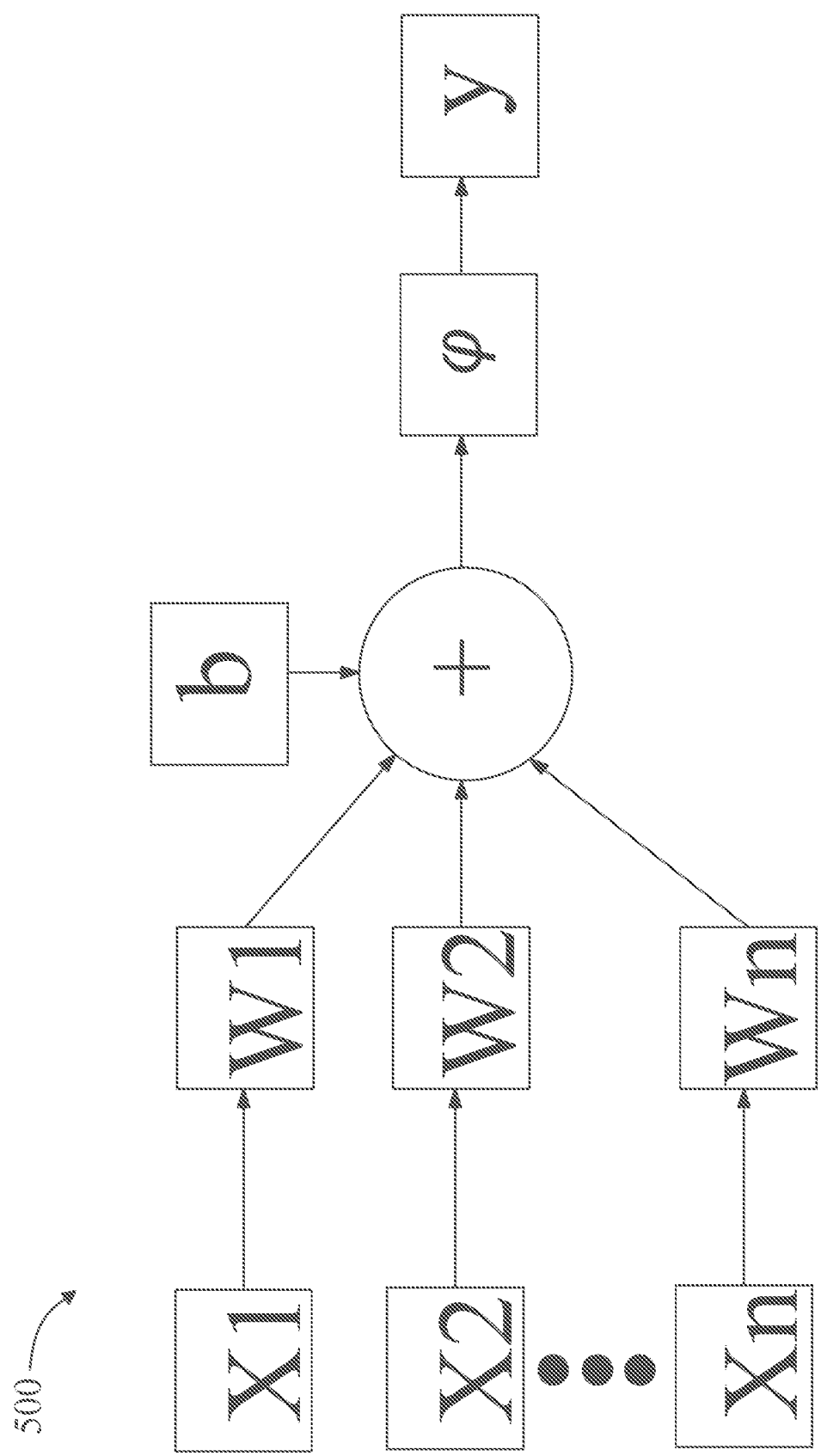
FIG. 5 is a diagram of an exemplary embodiment of a node of a neural network.

Referring now to FIG. 5, an exemplary embodiment of a node of a neural network is illustrated. A node may include, without limitation, a plurality of inputs $x_i$ that may receive numerical values from inputs to a neural network containing the node and/or from other nodes. Node may perform a weighted sum of inputs using weights $w_i$ that are multiplied by respective inputs $x_i$. Additionally or alternatively, a bias b may be added to the weighted sum of the inputs such that an offset is added to each unit in the neural network layer that is independent of the input to the layer. The weighted sum may then be input into a function φ, which may generate one or more outputs y. Weight $w_i$ applied to an input $x_i$ may indicate whether the input is "excitatory," indicating that it has strong influence on the one or more outputs y, for instance by the corresponding weight having a large numerical value, and/or a "inhibitory," indicating it has a weak effect influence on the one more inputs y, for instance by the corresponding weight having a small numerical value. The values of weights $w_i$ may be determined by training a neural network using training data, which may be performed using any suitable process as described above.

Figure 6:
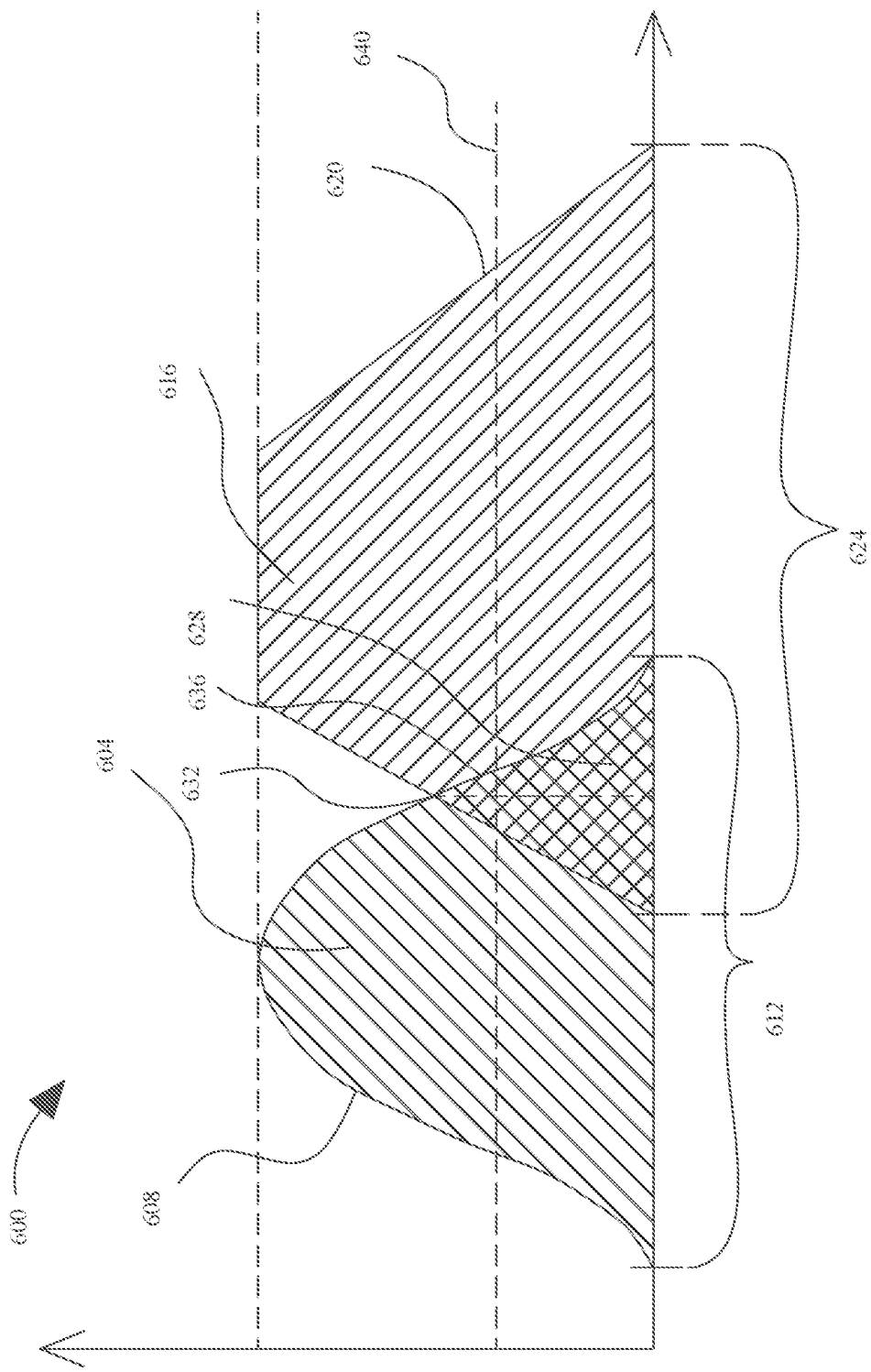
FIG. 6 is an illustration of an exemplary embodiment of fuzzy set comparison.

Now referring to FIG. 6, an exemplary embodiment of fuzzy set comparison 600 is illustrated. In a non-limiting embodiment, the fuzzy set comparison. In a non-limiting embodiment, fuzzy set comparison 600 may be consistent with fuzzy set comparison in FIG. 1. In another non-limiting the fuzzy set comparison 600 may be consistent with the name/version matching as described herein. For example and without limitation, the parameters, weights, and/or coefficients of the membership functions may be tuned using any machine-learning methods for the name/version matching as described herein. In another non-limiting embodiment, the fuzzy set may represent an element clusters 128 and a second set of signature scores from FIG. 1.

Alternatively or additionally, and still referring to FIG. 6, fuzzy set comparison 600 may be generated as a function of determining the data compatibility threshold. The compatibility threshold may be determined by a computing device. In some embodiments, a computing device may use a logic comparison program, such as, but not limited to, a fuzzy logic model to determine the compatibility threshold and/or version authenticator. Each such compatibility threshold may be represented as a value for a posting variable representing the compatibility threshold, or in other words a fuzzy set as described above that corresponds to a degree of compatibility and/or allowability as calculated using any statistical, machine-learning, or other method that may occur to a person skilled in the art upon reviewing the entirety of this disclosure. In some embodiments, determining the compatibility threshold and/or version authenticator may include using a linear regression model. A linear regression model may include a machine learning model. A linear regression model may map statistics such as, but not limited to, frequency of the same range of version numbers, and the like, to the compatibility threshold and/or version authenticator. In some embodiments, determining the compatibility threshold of any posting may include using a classification model. A classification model may be configured to input collected data and cluster data to a centroid based on, but not limited to, frequency of appearance of the range of versioning numbers, linguistic indicators of compatibility and/or allowability, and the like. Centroids may include scores assigned to them such that the compatibility threshold may each be assigned a score. In some embodiments, a classification model may include a K-means clustering model. In some embodiments, a classification model may include a particle swarm optimization model. In some embodiments, determining a compatibility threshold may include using a fuzzy inference engine. A fuzzy inference engine may be configured to map one or more compatibility threshold using fuzzy logic. In some embodiments, a plurality of computing devices may be arranged by a logic comparison program into compatibility arrangements. A "compatibility arrangement" as used in this disclosure is any grouping of objects and/or data based on skill level and/or output score. Membership function coefficients and/or constants as described above may be tuned according to classification and/or clustering algorithms. For instance, and without limitation, a clustering algorithm may determine a Gaussian or other distribution of questions about a centroid corresponding to a given compatibility threshold and/or version authenticator, and an iterative or other method may be used to find a membership function, for any membership function type as described above, that minimizes an average error from the statistically determined distribution, such that, for instance, a triangular or Gaussian membership function about a centroid representing a center of the distribution that most closely matches the distribution. Error functions to be minimized, and/or methods of minimization, may be performed without limitation according to any error function and/or error function minimization process and/or method as described in this disclosure.

Still referring to FIG. 6, inference engine may be implemented according to input element clusters 128 and second set of signature scores. For instance, an acceptance variable may represent a first measurable value pertaining to the classification of element clusters 128 to second set of signature scores. Continuing the example, an output variable may represent fraudulent signature input 136 associated with the user. In an embodiment, element clusters 128 and/or second set of signature scores may be represented by their own fuzzy set. In other embodiments, the classification of the data into fraudulent signature input 136 may be represented as a function of the intersection two fuzzy sets as shown in FIG. 6, An inference engine may combine rules, such as any semantic versioning, semantic language, version ranges, and the like thereof. The degree to which a given input function membership matches a given rule may be determined by a triangular norm or "T-norm" of the rule or output function with the input function, such as min (a, b), product of a and b, drastic product of a and b, Hamacher product of a and b, or the like, satisfying the rules of commutativity (T(a, b)=T(b, a)), monotonicity: (T(a, b)≤T (c, d) if a≤c and b≤d), (associativity: T(a, T(b, c))=T(T(a, b), c)), and the requirement that the number 1 acts as an identity element. Combinations of rules ("and" or "or" combination of rule membership determinations) may be performed using any T-conorm, as represented by an inverted T symbol or "⊥," such as max(a, b), probabilistic sum of a and b (a+b−a*b), bounded sum, and/or drastic T-conorm; any T-conorm may be used that satisfies the properties of commutativity: ⊥(a, b)=⊥(b, a), monotonicity: ⊥(a, b)≤⊥(c, d) if a≤c and b≤d, associativity: ⊥(a, ⊥(b, c))=⊥(⊥(a, b), c), and identity element of 0. Alternatively or additionally T-conorm may be approximated by sum, as in a "product-sum" inference engine in which T-norm is product and T-conorm is sum. A final output score or other fuzzy inference output may be determined from an output membership function as described above using any suitable defuzzification process, including without limitation Mean of Max defuzzification, Centroid of Area/Center of Gravity defuzzification, Center Average defuzzification, Bisector of Area defuzzification, or the like. Alternatively or additionally, output rules may be replaced with functions according to the Takagi-Sugeno-King (TSK) fuzzy model.

A first fuzzy set 604 may be represented, without limitation, according to a first membership function 608 representing a probability that an input falling on a first range of values 612 is a member of the first fuzzy set 604, where the first membership function 608 has values on a range of probabilities such as without limitation the interval [0,1], and an area beneath the first membership function 608 may represent a set of values within first fuzzy set 604. Although first range of values 612 is illustrated for clarity in this exemplary depiction as a range on a single number line or axis, first range of values 612 may be defined on two or more dimensions, representing, for instance, a Cartesian product between a plurality of ranges, curves, axes, spaces, dimensions, or the like. First membership function 608 may include any suitable function mapping first range 612 to a probability interval, including without limitation a triangular function defined by two linear elements such as line segments or planes that intersect at or below the top of the probability interval. As a non-limiting example, triangular membership function may be defined as:

$$y(x, a, b, c) = \begin{cases} 0, & \text{for } x > c \text{ and } x < a \\ \frac{x-a}{b-a}, & \text{for } a \leq x < b \\ \frac{c-x}{c-b}, & \text{if } b < x \leq c \end{cases}$$

a trapezoidal membership function may be defined as:

$$y(x, a, b, c, d) = \max\left(\min\left(\frac{x-a}{b-a}, 1, \frac{d-x}{d-c}\right), 0\right)$$

a sigmoidal function may be defined as:

$$y(x, a, c) = \frac{1}{1 - e^{-a(x-c)}}$$

a Gaussian membership function may be defined as:

$$y(x, c, \sigma) = e^{-\frac{1}{2}(\frac{x-c}{\sigma})^2}$$

and a bell membership function may be defined as:

$$y(x, a, b, c,) = \left[1 + \left|\frac{x-c}{a}\right|^{2b}\right]^{-1}$$

Persons skilled in the art, upon reviewing the entirety of this disclosure, will be aware of various alternative or additional membership functions that may be used consistently with this disclosure.

First fuzzy set 604 may represent any value or combination of values as described above, including any element clusters 128 and second set of signature scores. A second fuzzy set 616, which may represent any value which may be represented by first fuzzy set 604, may be defined by a second membership function 620 on a second range 624; second range 624 may be identical and/or overlap with first range 612 and/or may be combined with first range via Cartesian product or the like to generate a mapping permitting evaluation overlap of first fuzzy set 604 and second fuzzy set 616. Where first fuzzy set 604 and second fuzzy set 616 have a region 636 that overlaps, first membership function 608 and second membership function 620 may intersect at a point 632 representing a probability, as defined on probability interval, of a match between first fuzzy set 604 and second fuzzy set 616. Alternatively or additionally, a single value of first and/or second fuzzy set may be located at a locus 636 on first range 612 and/or second range 624, where a probability of membership may be taken by evaluation of first membership function 608 and/or second membership function 620 at that range point. A probability at 628 and/or 632 may be compared to a threshold 640 to determine whether a positive match is indicated. Threshold 640 may, in a non-limiting example, represent a degree of match between first fuzzy set 604 and second fuzzy set 616, and/or single values therein with each other or with either set, which is sufficient for purposes of the matching process; for instance, the classification into one or more query categories may indicate a sufficient degree of overlap with fuzzy set representing element clusters 128 and second set of signature scores for combination to occur as described above. Each threshold may be established by one or more user inputs. Alternatively or additionally, each threshold may be tuned by a machine-learning and/or statistical process, for instance and without limitation as described in further detail below.

In an embodiment, a degree of match between fuzzy sets may be used to rank one resource against another. For instance, if both element clusters 128 and second set of signature scores have fuzzy sets, fraudulent signature inputs 136 may be generated by having a degree of overlap exceeding a predictive threshold, processor 104 may further rank the two resources by ranking a resource having a higher degree of match more highly than a resource having a lower degree of match. Where multiple fuzzy matches are performed, degrees of match for each respective fuzzy set may be computed and aggregated through, for instance, addition, averaging, or the like, to determine an overall degree of match, which may be used to rank resources; selection between two or more matching resources may be performed by selection of a highest-ranking resource, and/or multiple notifications may be presented to a user in order of ranking.

Figure 7:
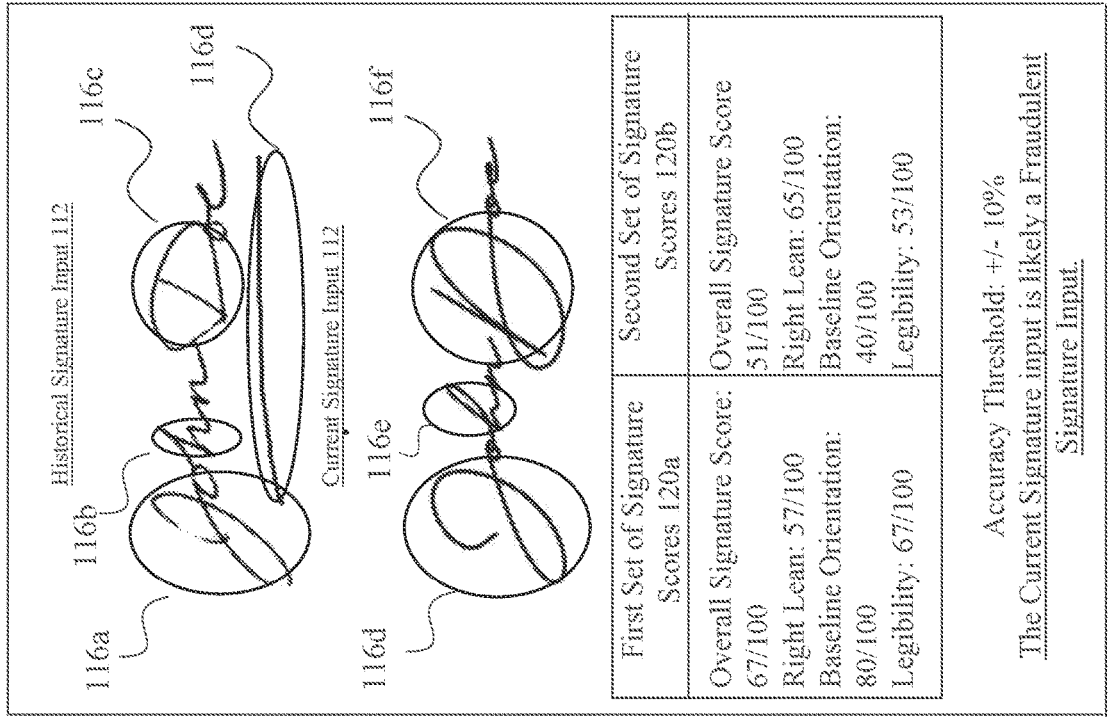
FIG. 7 is an exemplary embodiment of a user interface.

Referring now to FIG. 7, an exemplary illustration of user interface 700. User interface 700 may be designed to compare two or more signature inputs 112 for purposes such as verification, authentication, or handwriting analysis. User interface 700 may display exemplary embodiments of historical signature inputs 112a and current signature inputs 112b. User Interface 700 may display highlighted and annotated versions signature elements 116a-f associated with each signature input 112. These elements, such as the slant, size, pressure, baseline orientation, flourishes, vertices, contours, of the signatures, may be relevant in determining the authenticity and characteristics of the handwriting. The interface might use color coding, bounding boxes, circles, or other visual markers to draw attention to these signature elements 116a-f making it easier for users to focus on specific areas of interest. In an embodiment, user interface 700 may include a feature where signature elements 116 of the first signature input 112a-d, like the slant or loop size, are directly compared with corresponding signature elements 116e-f of the second signature input 112b. This comparative analysis may be visually represented with a signature score 120 or side-by-side comparisons of each element. User interface 700 may be designed to display both signature inputs side by side for easy visual comparison. It could feature high-resolution images of the signatures, ensuring that all nuances and details are clearly visible. This dual-display setup allows users to quickly identify similarities and differences between the two signatures.

With continued reference to FIG. 7, the user interface 700 may include a clean and intuitive layout, where users can easily upload image data 108. The user interface 700 might have designated areas or drag-and-drop functionality for uploading each signature. These areas could be labeled, for example, as "Current Signature Input," "Historical Signature," and so on, to help users organize the signatures they want to compare. There may also be support for various image formats like JPEG, PNG, or TIFF to accommodate different types of input files. Once the signatures are uploaded, the interface may automatically perform necessary pre-processing steps, such as resizing, enhancing contrast, or converting to grayscale to standardize the images for comparison. The pre-processed signatures may then be displayed side-by-side or in a grid format, allowing the user to visually inspect them before delving into deeper analysis. The interface 700 may provide a range of tools and features for users to analyze the signature inputs. In an embodiment, users may be able to zoom in on specific signature elements 116 of the signatures and pan around to examine finer details like stroke thickness, curvature, and pressure points. In another embodiment, user interface 700 may display highlighted areas of interest, measure distances between specific points, and annotate observations directly on the images. The interface 700 may include an option for automated analysis, where the software uses algorithms to compare signatures and highlight similarities or discrepancies. This analysis could provide a preliminary report or signature score indicating the degree of match or variation between the signatures.

Figure 8:
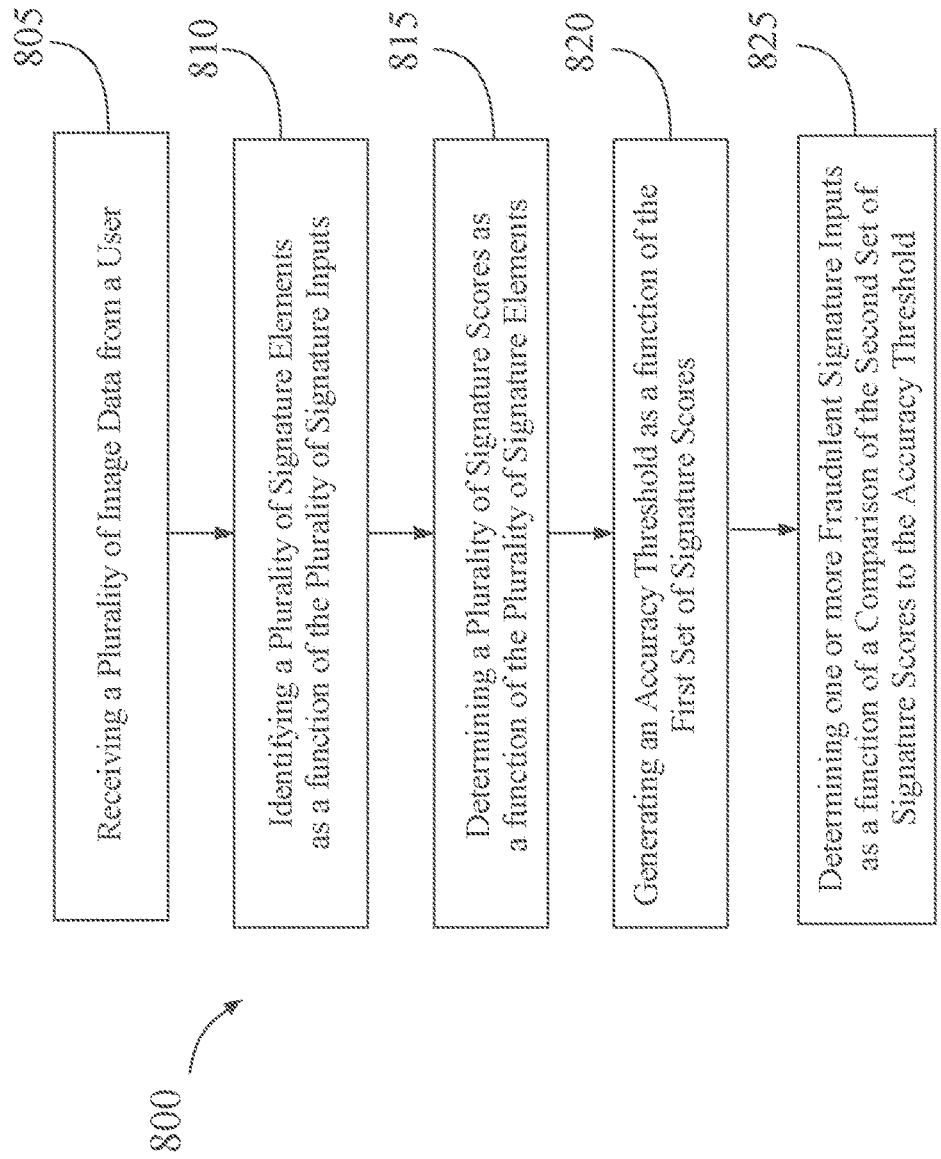
FIG. 8 is a flow diagram of an exemplary method for detecting fraudulent signature inputs.

Referring now to FIG. 8, a flow diagram of an exemplary method 800 for detecting fraudulent signature inputs is illustrated. At step 805, method 800 includes receiving, using at least a processor, a plurality of image data from a user. This may be implemented as described and with reference to FIGS. 1-8. In an embodiment, the plurality of signature inputs may include one or more historical signature inputs and one or more current signature inputs.

Still referring to FIG. 8, at step 810, method 800 includes identifying, using the at least a processor, a plurality of signature elements as a function of the plurality of signature inputs. This may be implemented as described and with reference to FIGS. 1-8. In an embodiment, the plurality of signature elements may include at least a baseline orientation and/or at least a slant of a character. In an additional embodiment, identifying the plurality of signature elements may include identifying the plurality of signature elements using optical character recognition (OCR) and/or a natural language processing model. In some cases, identifying the wherein identifying the plurality of signature elements additionally comprises identifying one or more characters within each signature input of the plurality of signature inputs and identifying the plurality of signature elements associated with each character of the one or more characters.

Still referring to FIG. 8, at step 815, method 800 includes determining, using the at least a processor, a plurality of signature scores as a function of the plurality of signature elements, wherein the plurality of signature scores comprises a first set of signature scores and a second set of signature scores. This may be implemented as described and with reference to FIGS. 1-8. In an embodiment, the method may further include identifying, using the at least a processor, one or more element clusters as a function of the first set of signature scores.

Still referring to FIG. 8, at step 820, method 800 includes generating, using the at least a processor, an accuracy threshold as a function of the first set of signature scores. This may be implemented as described and with reference to FIGS. 1-8. In an embodiment, generating the accuracy threshold may include identifying a membership criterion of the one or more element clusters.

Still referring to FIG. 8, at step 825, method 800 includes determining, using the at least a processor, one or more fraudulent signature inputs from the plurality of signature inputs as a function of a comparison of the second set of signature scores to the accuracy threshold. This may be implemented as described and with reference to FIGS. 1-8. In an embodiment, comparing the second set of signature scores to an accuracy threshold may include identifying whether the second set of signature scores satisfies the membership criteria for the one or more element clusters.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 9:
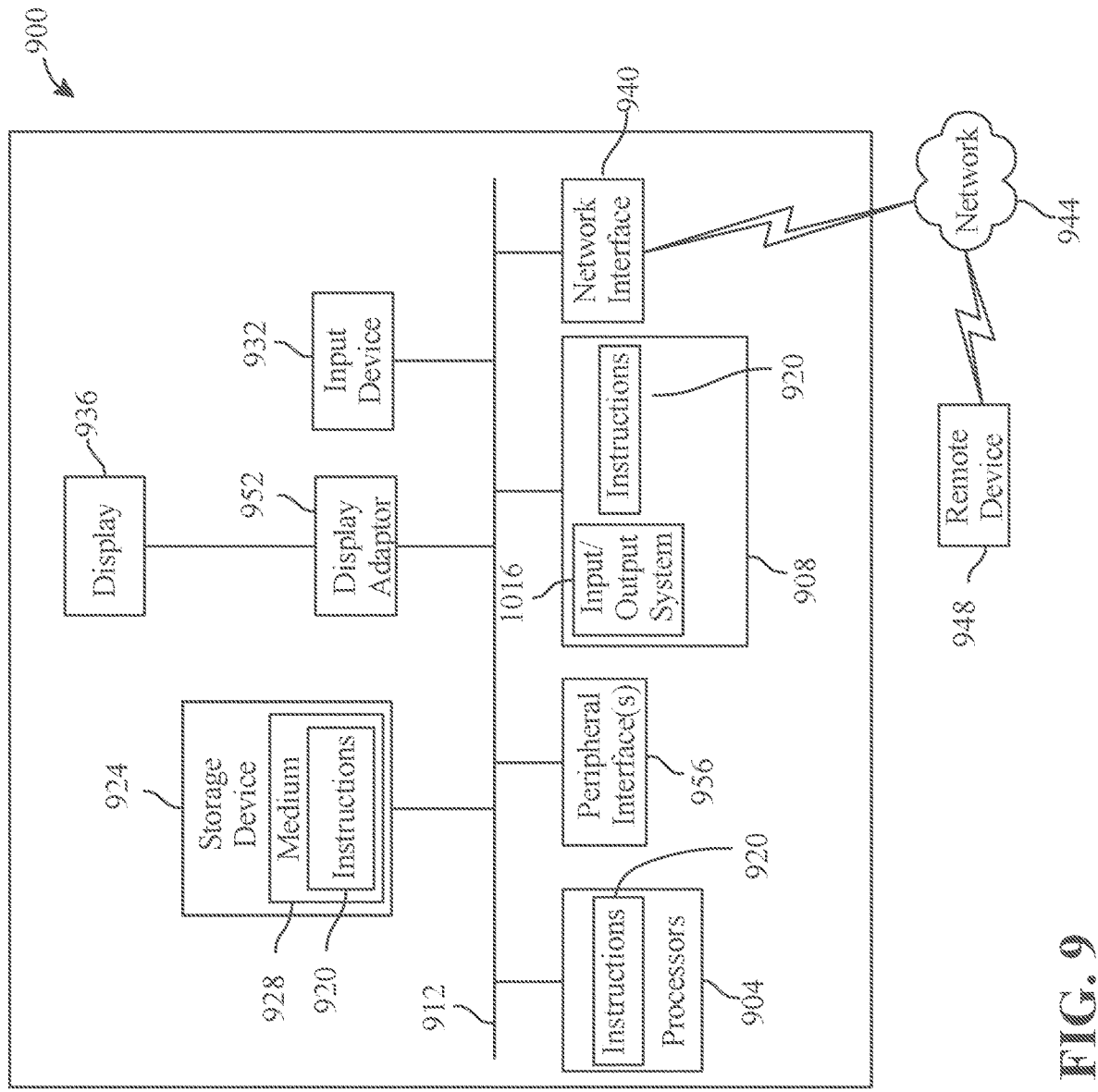
FIG. 9 is a block diagram of a computing system that can be used to implement any one or more of the methodologies disclosed herein and any one or more portions thereof.

FIG. 9 shows a diagrammatic representation of one embodiment of a computing device in the exemplary form of a computer system 900 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 900 includes a processor 904 and a memory 908 that communicate with each other, and with other components, via a bus 912. Bus 912 may include any of several types of bus structures including, but not limited to, a memory bus, a memory controller, a peripheral bus, a local bus, and any combinations thereof, using any of a variety of bus architectures.

Processor 904 may include any suitable processor, such as without limitation a processor incorporating logical circuitry for performing arithmetic and logical operations, such as an arithmetic and logic unit (ALU), which may be regulated with a state machine and directed by operational inputs from memory and/or sensors; processor 904 may be organized according to Von Neumann and/or Harvard architecture as a non-limiting example. Processor 904 may include, incorporate, and/or be incorporated in, without limitation, a microcontroller, microprocessor, digital signal processor (DSP), Field Programmable Gate Array (FPGA), Complex Programmable Logic Device (CPLD), Graphical Processing Unit (GPU), general purpose GPU, Tensor Processing Unit (TPU), analog or mixed signal processor, Trusted Platform Module (TPM), a floating point unit (FPU), and/or system on a chip (SoC).

Memory 908 may include various components (e.g., machine-readable media) including, but not limited to, a random-access memory component, a read only component, and any combinations thereof. In one example, a basic input/output system 916 (BIOS), including basic routines that help to transfer information between elements within computer system 900, such as during start-up, may be stored in memory 908. Memory 908 may also include (e.g., stored on one or more machine-readable media) instructions (e.g., software) 920 embodying any one or more of the aspects and/or methodologies of the present disclosure. In another example, memory 908 may further include any number of program modules including, but not limited to, an operating system, one or more application programs, other program modules, program data, and any combinations thereof.

Computer system 900 may also include a storage device 924. Examples of a storage device (e.g., storage device 924) include, but are not limited to, a hard disk drive, a magnetic disk drive, an optical disc drive in combination with an optical medium, a solid-state memory device, and any combinations thereof. Storage device 924 may be connected to bus 912 by an appropriate interface (not shown). Example interfaces include, but are not limited to, SCSI, advanced technology attachment (ATA), serial ATA, universal serial bus (USB), IEEE 1394 (FIREWIRE), and any combinations thereof. In one example, storage device 924 (or one or more components thereof) may be removably interfaced with computer system 900 (e.g., via an external port connector (not shown)). Particularly, storage device 924 and an associated machine-readable medium 928 may provide nonvolatile and/or volatile storage of machine-readable instructions, data structures, program modules, and/or other data for computer system 900. In one example, software 920 may reside, completely or partially, within machine-readable medium 928. In another example, software 920 may reside, completely or partially, within processor 904.

Computer system 900 may also include an input device 932. In one example, a user of computer system 900 may enter commands and/or other information into computer system 900 via input device 932. Examples of an input device 932 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 932 may be interfaced to bus 912 via any of a variety of interfaces (not shown) including, but not limited to, a serial interface, a parallel interface, a game port, a USB interface, a FIREWIRE interface, a direct interface to bus 912, and any combinations thereof. Input device 932 may include a touch screen interface that may be a part of or separate from display 936, discussed further below. Input device 932 may be utilized as a user selection device for selecting one or more graphical representations in a graphical interface as described above.

A user may also input commands and/or other information to computer system 900 via storage device 924 (e.g., a removable disk drive, a flash drive, etc.) and/or network interface device 940. A network interface device, such as network interface device 940, may be utilized for connecting computer system 900 to one or more of a variety of networks, such as network 944, and one or more remote devices 948 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 944, may employ a wired and/or a wireless mode of communication. In general, any network topology may be used. Information (e.g., data, software 920, etc.) may be communicated to and/or from computer system 900 via network interface device 940.

Computer system 900 may further include a video display adapter 952 for communicating a displayable image to a display device, such as display device 936. Examples of a display device include, but are not limited to, a liquid crystal display (LCD), a cathode ray tube (CRT), a plasma display, a light emitting diode (LED) display, and any combinations thereof. Display adapter 952 and display device 936 may be utilized in combination with processor 904 to provide graphical representations of aspects of the present disclosure. In addition to a display device, computer system 900 may include one or more other peripheral output devices including, but not limited to, an audio speaker, a printer, and any combinations thereof. Such peripheral output devices may be connected to bus 912 via a peripheral interface 956. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. An apparatus for detecting fraudulent signature inputs, wherein the apparatus comprises:

at least a processor; and a memory communicatively connected to the at least a processor, wherein the memory containing instructions configuring the at least a processor to:
- receive a plurality of image data from a user;
- identify a plurality of signature elements as a function of the plurality of signature inputs;
- determine a plurality of signature scores as a function of the plurality of signature elements, wherein the plurality of signature scores comprises a first set of signature scores and a second set of signature scores, wherein determining the plurality of signature elements additionally comprises:
  - iteratively training a score classifier using a plurality of score training data, wherein the plurality of score training data comprises the plurality of signature elements as inputs correlated to examples of signature scores as outputs; and
  - identifying the plurality of signature scores as a function of the plurality of image data using the trained score classifier;
- generate an accuracy threshold as a function of the first set of signature scores; and
- determine one or more fraudulent signature inputs from the plurality of signature inputs as a function of a comparison of the second set of signature scores to the accuracy threshold.

2. The apparatus of claim 1, wherein the plurality of signature elements comprises at least a baseline orientation.

3. The apparatus of claim 1, wherein the plurality of signature elements comprises at least a slant of a character.

4. The apparatus of claim 1, wherein identifying the plurality of signature elements comprises identifying the plurality of signature elements using optical character recognition (OCR).

5. The apparatus of claim 1, wherein identifying the plurality of signature elements comprises identifying the plurality of signature elements using a natural language processing model.

6. The apparatus of claim 1, wherein identifying the plurality of signature elements additionally comprises:
- identify one or more characters within each signature input of the plurality of signature inputs; and
- identifying the plurality of signature elements associated with each character of the one or more characters.

7. The apparatus of claim 1, wherein the memory further instructs the processor to identify one or more element clusters as a function of the first set of signature scores.

8. The apparatus of claim 7, wherein generating the accuracy threshold comprises identifying a membership criterion of the one or more element clusters.

9. The apparatus of claim 8, wherein comparing the second set of signature scores to the accuracy threshold comprises identifying whether the second set of signature scores satisfies the membership criteria for the one or more element clusters.

10. The apparatus of claim 1, wherein the plurality of signature inputs comprises one or more historical signature inputs and one or more current signature inputs.

11. A method for detecting fraudulent signature inputs, wherein the method comprises:
- receiving, using at least a processor, a plurality of image data from a user;
- identifying, using the at least a processor, a plurality of signature elements as a function of the plurality of signature inputs;
- determining, using the at least a processor, a plurality of signature scores as a function of the plurality of signature elements, wherein the plurality of signature scores comprises a first set of signature scores and a second set of signature scores, wherein determining the plurality of signature elements additionally comprises:
  - iteratively training a score classifier using a plurality of score training data, wherein the plurality of score training data comprises the plurality of signature elements as inputs correlated to examples of signature scores as outputs; and
  - identifying the plurality of signature scores as a function of the plurality of image data using a trained score classifier;
- generating, using the at least a processor, an accuracy threshold as a function of the first set of signature scores; and
- determining, using the at least a processor, one or more fraudulent signature inputs from the plurality of signature inputs as a function of a comparison of the second set of signature scores to the accuracy threshold.

12. The method of claim 11, wherein the plurality of signature elements comprises at least a baseline orientation.

13. The method of claim 11, wherein the plurality of signature elements comprises at least a slant of a character.

14. The method of claim 11, wherein identifying the plurality of signature elements comprises identifying the plurality of signature elements using optical character recognition (OCR).

15. The method of claim 11, wherein identifying the plurality of signature elements comprises identifying the plurality of signature elements using a natural language processing model.

16. The method of claim 11, wherein identifying the plurality of signature elements additionally comprises:
- identify one or more characters within each signature input of the plurality of signature inputs; and
- identifying the plurality of signature elements associated with each character of the one or more characters.

17. The method of claim 11, wherein the method further comprises identifying, using the at least a processor, one or more element clusters as a function of the first set of signature scores.

18. The method of claim 17, wherein generating the accuracy threshold comprises identifying a membership criterion of the one or more element clusters.

19. The method of claim 18, wherein comparing the second set of signature scores to the accuracy threshold comprises identifying whether the second set of signature scores satisfies the membership criteria for the one or more element clusters.

20. The method of claim 11, wherein the plurality of signature inputs comprises one or more historical signature inputs and one or more current signature inputs.

* * * * *